(12) United States Patent
Hatano et al.

(10) Patent No.: US 10,465,826 B2
(45) Date of Patent: Nov. 5, 2019

(54) ROTARY JOINT

(71) Applicant: RIX CORPORATION, Fukuoka-shi, Fukuoka (JP)

(72) Inventors: Shinji Hatano, Fukuoka (JP); Yuki Itahashi, Fukuoka (JP)

(73) Assignee: RIX CORPORATION, Fukuoka-shi, Fukuoka (JP)

( * ) Notice: Subject to any disclaimer, the term of this patent is extended or adjusted under 35 U.S.C. 154(b) by 611 days.

(21) Appl. No.: 15/039,719

(22) PCT Filed: Oct. 24, 2014

(86) PCT No.: PCT/JP2014/078383
§ 371 (c)(1),
(2) Date: May 26, 2016

(87) PCT Pub. No.: WO2015/079841
PCT Pub. Date: Jun. 4, 2015

(65) Prior Publication Data
US 2016/0377210 A1   Dec. 29, 2016

(30) Foreign Application Priority Data

Nov. 28, 2013 (JP) .................................. 2013-246434

(51) Int. Cl.
*F16L 27/08* (2006.01)
(52) U.S. Cl.
CPC .................................. *F16L 27/082* (2013.01)
(58) Field of Classification Search
CPC ..... F16L 27/082; F16L 27/08; F16L 27/0808; F16L 27/12
(Continued)

(56) References Cited

U.S. PATENT DOCUMENTS 4,561,681 A   12/1985  Lebsock
4,817,995 A    4/1989  Deubler et al.
(Continued)

FOREIGN PATENT DOCUMENTS

DE   102011122425 A1   6/2013
GB        1029699 A    5/1966
(Continued)

OTHER PUBLICATIONS

International Search Report (in Japanese with English Translation) for PCT/JP2014/078383, dated Jan. 20, 2015; ISA/JP.

*Primary Examiner* — Anna M Momper
*Assistant Examiner* — Fannie C Kee
(74) *Attorney, Agent, or Firm* — Harness, Dickey & Pierce, P.L.C.

(57) ABSTRACT

A rotary joint having a rotating part provided with a rotating channel in an axial direction, attached to a shaft, and advancing and retracting in the axial direction and, arranged coaxially, a stationary part provided with a stationary channel in the axial direction, wherein an engagement part which allows relative rotation of a rotating seal part provided at the rotating part and a stationary seal part provided at the stationary part while stopping movement in the axial direction and holds a state in which the two sealing surfaces of said rotating seal part and stationary seal part are made to abut facing each other and wherein a rotation stopping mechanism restricting relative rotation of the stationary shaft part with respect to the fitting hole about the axis are provided.

10 Claims, 15 Drawing Sheets

(58) Field of Classification Search
USPC ...... 285/98, 121.1, 190, 273, 276, 280–281,
285/347, 351, 282, 301
See application file for complete search history.

(56) References Cited

U.S. PATENT DOCUMENTS

| | | | |
|---|---|---|---|
| 5,022,686 A | 6/1991 | Heel et al. | |
| 5,538,292 A | 7/1996 | Sommer | |
| 5,577,775 A * | 11/1996 | Pearson | F16L 27/082 |
| | | | 285/24 |
| 5,617,879 A * | 4/1997 | Kubala | F16J 15/164 |
| | | | 277/398 |
| 5,669,636 A * | 9/1997 | Kubala | B23Q 11/1015 |
| | | | 285/281 |
| 6,029,695 A | 2/2000 | Logan | |
| 6,473,951 B1 | 11/2002 | Nakaminami et al. | |
| 6,533,509 B1 | 3/2003 | Antoun | |
| 7,416,224 B2 * | 8/2008 | Ott | F16L 27/082 |
| | | | 277/375 |
| 8,453,675 B2 | 6/2013 | Burrus et al. | |

FOREIGN PATENT DOCUMENTS

| | | |
|---|---|---|
| JP | S62061441 U | 4/1987 |
| JP | H11336969 A | 12/1999 |
| JP | 3037900 B2 | 5/2000 |
| JP | 2002168383 A | 6/2002 |
| JP | 2007307689 A | 11/2007 |
| JP | 2008261405 A | 10/2008 |
| JP | 2010101361 A | 5/2010 |
| JP | 2011102611 A | 5/2011 |
| JP | 2011127757 A | 6/2011 |
| JP | 2012047220 A | 3/2012 |
| JP | 2013170612 A | 9/2013 |
| JP | 2013253644 A | 12/2013 |
| JP | 2014016010 A | 1/2014 |
| WO | WO-2006080280 A1 | 8/2006 |

* cited by examiner

DOWNSTREAM SIDE ←→ UPSTREAM SIDE

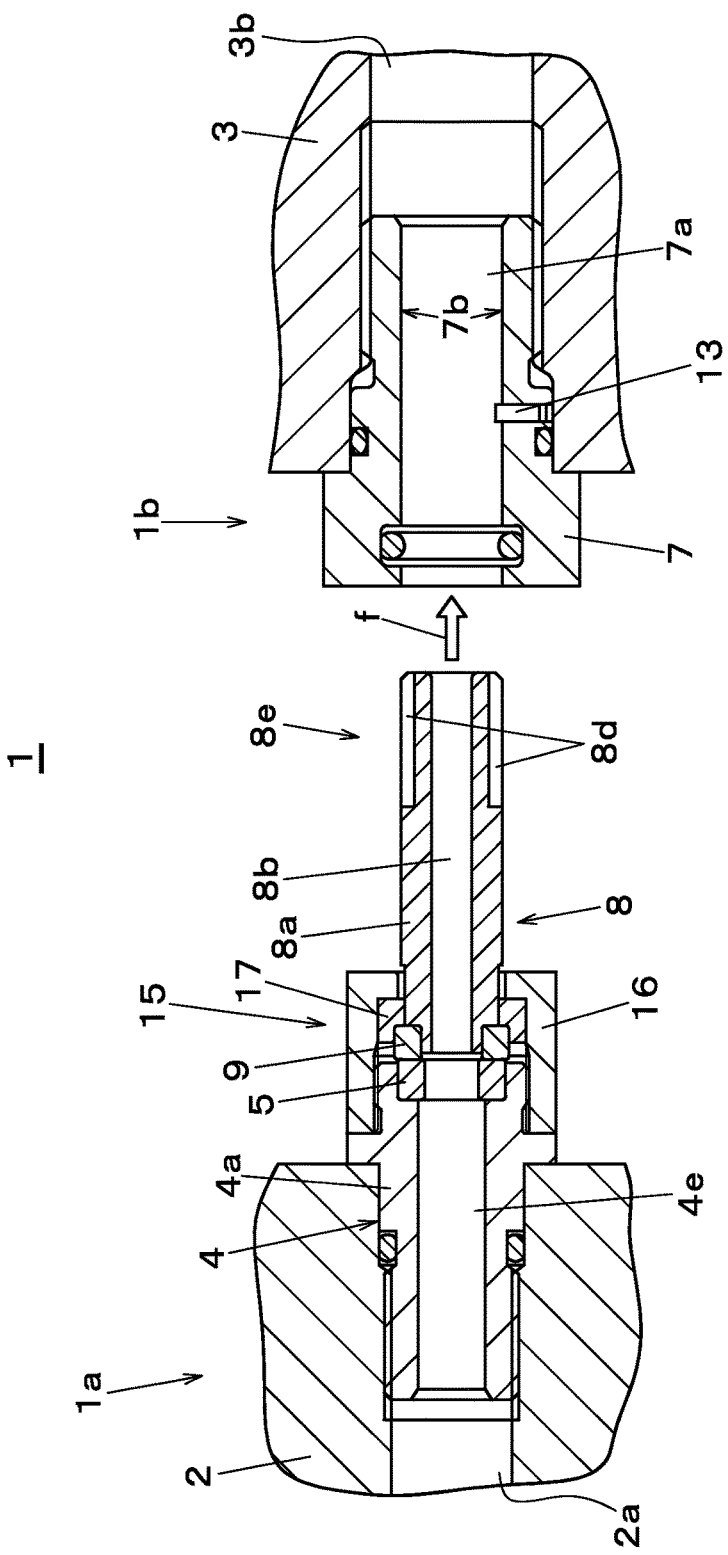

ROTARY JOINT

This application is a U.S. National Phase Application under 35 U.S.C. 371 of International Application No. PCT/JP2014/078383 filed on Oct. 24, 2014 and published in Japanese as WO 2015/079841 A1 on Jun. 4, 2015. This claims priority to Japanese Application No. 2013-246434 filed on Nov. 28, 2013. The entire disclosures of all of the above applications are incorporated herein by reference.

TECHNICAL FIELD

The present invention relates to a rotary joint used for supplying fluid to a rotating part.

BACKGROUND ART

When supplying a spindle of a machine tool or other such rotating part which is in a rotating state during operation with a coolant for cooling use or other fluid, a hydraulic joint is used for connecting a stationary fluid supply pipe with a channel of the rotating part. As such a hydraulic joint in a fluid supply mechanism, a rotary joint is used. In a rotary joint, a shaft which is coupled and rotates with a rotating part and a non-rotating stationary shaft which is connected to a fluid supply pipe, are arranged coaxially and made to face each other in the axial direction. The sealing surfaces of seal members attached to the respective facing end faces are made to intimately contact each other to form a face seal (seal comprised of surfaces contacting each other) to prevent leakage of fluid. Due to this configuration, it is possible to continuously supply fluid from a non-rotating fluid supply pipe to a rotating state rotating part through the rotary joint.

In a rotary joint used for a machine tool making a drawbar advance and retract etc., to make the sealing surfaces intimately contact each other, the non-rotating stationary shaft has to be made to move relative to the shaft in the axial direction. The relative movement in the axial direction, in the prior art, was performed by making the fluid power of the fluid supplied act on the upstream side end part of the supplied fluid at the stationary shaft and making the stationary shaft slide in a fitting hole (for example, see PLTs 1 and 2). The "stationary shaft" here indicates the shaft at the stationary side connected to a stationary fluid supply pipe. The case of a shaft which slides in a fitting hole without rotating is also included in a "stationary shaft". The "upstream side" and the "downstream side" indicate the upstream side and downstream side of the supplied fluid.

In the prior art shown in PLT 1, the fluid power of the fluid supplied is made to act on the upstream side end part of the stationary shaft and make the stationary shaft slide in the fitting hole to thereby form the face seal. Further, in the prior art shown in PLT 2, in the same way as PLT 1, the fluid power is made to act on the upstream side end part of the stationary shaft. In addition, the fluid power is also made to act on a movement member slidably fit in a fitting hole and the movement member is made to abut against the upstream side end part of the stationary shaft at the start of operation so as to supplement the drive force. Note that, as one example of a machine tool making a drawbar advance and retract, one such as disclosed in PLT 3 may be mentioned.

CITATIONS LIST

Patent Literature
PLT 1. Japanese Unexamined Patent Publication No. 2010-101361
PLT 2. Japanese Unexamined Patent Publication No. 2011-102611
PLT 3. Japanese Unexamined Patent Publication No. 2007-307689

SUMMARY OF INVENTION

Technical Problem

However, in the above prior art, in each case, there was the following difficulty due to the stationary shaft being made to slide so as form the face seal. At the time of start of operation of the rotary joint, fluid is supplied in an open state in which the sealing surfaces are not in intimate contact, so before the stationary shaft moves and the face seal is formed, a large amount of the fluid unavoidably diffuses and particles fly off to the outside. Further, if sludge or other foreign matter deposits at the sliding clearance of the stationary shaft in the fitting hole, abnormal operation will occur due to the poor sliding action of the stationary shaft and cause serious accidents such as massive leakage of the fluid.

If trying to prevent poor sliding action of the stationary shaft, it is necessary to secure a drive force for making the stationary shaft slide. However, in this case, the stationary shaft would move at a high speed, so the impact when the sealing surfaces close or the excessive sealing surface pressure would be liable to damage the seal members. Further, in the state where the face seal is formed, the stationary shaft is held at one side in the fitting hole, so the problem easily arises that slight vibration would occur in the sealing surfaces and the sealing surfaces would be worn down.

Furthermore, at a workplace where a rotary joint is used, work for assembling the rotating part and stationary part forming the rotary joint becomes necessary. The stationary part is provided with a rotation stopping pin or other rotation stopping mechanism for preventing the stationary shaft from being rotated by being drawn along. For this reason, in assembly work, positioning work for making the position of the stationary shaft in the circumferential direction register with the fitting hole has been considered necessary. In the prior art, such positioning work is performed half by feel alone in a cramped work space. Improvement in the work efficiency of assembly work on-site has been desired.

In a rotary joint of the prior art including the above-mentioned PLTs 1 and 2, in a configuration making the stationary part move in the axial direction with respect to the rotating part, it was not possible to stably and reliably make the stationary part move and was difficult to effectively prevent poor operation or impact on the seal members. Furthermore, there were the problems that it was difficult to suppress leakage of fluid to the outside and the work efficiency of the assembly work on-site was poor.

The present invention has as its object the provision of a rotary joint which can stabilize relative movement between the stationary part and the rotating part to effectively prevent poor operation or impact on the seal members and can suppress leakage of fluid to the outside and is excellent in work efficiency in assembly work.

Solution to Problem

The rotary joint is a rotary joint comprising
a rotating part provided with a rotating channel in an axial direction, attached to a shaft, and advancing and retracting in said axial direction,
a stationary part provided with a stationary channel in said axial direction and arranged coaxially with the rotating part, wherein fluid supplied from a fluid supply source is supplied to the rotating channel of said rotating part rotating about an axis thereof through said stationary channel, a rotating seal part provided at said rotating part, and having a first sealing surface having said rotating channel opening at a side end face of said rotating part, a stationary seal part
  having a stationary shaft part fit in a fitting hole, which is formed in said axial direction and provided at said stationary part in a state where movement in said axial direction is allowed, and
  having a second sealing surface having said stationary channel opening at a side end face of one side of said stationary shaft part, a rotation stopping mechanism restricting relative rotation of said stationary shaft part with respect to said fitting hole about the axis, and an engagement part allowing relative rotation of said rotating seal part and stationary seal part while stopping movement in said axial direction to hold a state where said first sealing surface and second sealing surface abut facing each other, wherein said rotation stopping mechanism comprises
  a shaft side engagement part provided at said stationary shaft part,
  a hole side engagement part provided at said fitting hole and engaging with said shaft side engagement part to restrict said relative rotation, and
  an engagement guide part guiding said shaft side engagement part to said hole side engagement part to make them engage in an operation for fitting said stationary shaft part into said fitting hole,
said engagement part makes said first sealing surface and second sealing surface abut whereby a face seal is formed, and
said rotating part is made to advance and retract in the state where said face seal is formed, whereby said stationary shaft part advances and retracts in the axial direction together with said rotating part.

The rotary joint is a rotary joint comprising
a rotating part provided with a rotating channel in an axial direction, attached to a shaft, and advancing and retracting in said axial direction,
a stationary part provided with a stationary channel in said axial direction and arranged coaxially with the rotating part, wherein fluid supplied from a fluid supply source is supplied to the rotating channel of said rotating part rotating about an axis thereof through said stationary channel,
a stationary seal part provided at said stationary part, and having a first sealing surface having said stationary channel opening at a side end face of said stationary part, a rotating seal part
  having a shaft part fit in a fitting hole, which is formed in said axial direction and provided at said rotating part in a state where movement in said axial direction is allowed, and
  having a second sealing surface having said rotating channel opening at a side end face of one side of said shaft part, a rotation stopping mechanism restricting relative rotation of said shaft part with respect to said fitting hole about the axis, and an engagement part allowing relative rotation of said stationary seal part and rotating seal part while stopping movement in said axial direction to hold a state where said first sealing surface and second sealing surface abut facing each other, wherein said rotation stopping mechanism comprises
  a shaft side engagement part provided at said shaft part,
  a hole side engagement part provided at said fitting hole and engaging with said shaft side engagement part to thereby restrict said relative rotation, and
  an engagement guide part guiding said shaft side engagement part to said hole side engagement part to make them engage in an operation for fitting said shaft part into said fitting hole,
said engagement part makes said first sealing surface and second sealing surface abut whereby a face seal is formed, and
said rotating part is made to advance and retract in the state where said face seal is formed whereby said rotating part advances and retracts in the axial direction with respect to said rotating part locked with said stationary seal part.

Advantageous Effects of Invention

According to the present invention, by providing a rotary joint with "an engagement part which allows relative rotation of a rotating seal part provided at the rotating part and a stationary seal part provided at the stationary part while stopping movement in the axial direction and holds a state in which the two sealing surfaces of the rotating seal part and stationary seal part are made to abut facing each other" and "a rotation stopping mechanism restricting relative rotation of the shaft part with respect to the fitting hole about the axis", it is possible to stabilize relative movement of the stationary part and the rotating part to effectively prevent poor operation or impact on the seal members. Furthermore, it is possible to suppress leakage of fluid to the outside and realize a rotary joint excellent in work efficiency in assembly work.

BRIEF DESCRIPTION OF DRAWINGS

FIG. 2b is a detailed cross-sectional view of a part P in FIG. 2a.

FIG. 2c is an explanatory view for explaining a sliding surface of a second seal ring 9 in FIG. 2a.

FIG. 4 is an explanatory view of the operation of a rotary joint in an embodiment 1 of the present invention.

FIG. 9b is a detailed cross-sectional view of a part Q in FIG. 9a.

DESCRIPTION OF EMBODIMENTS

Embodiment 1

Figure 1:
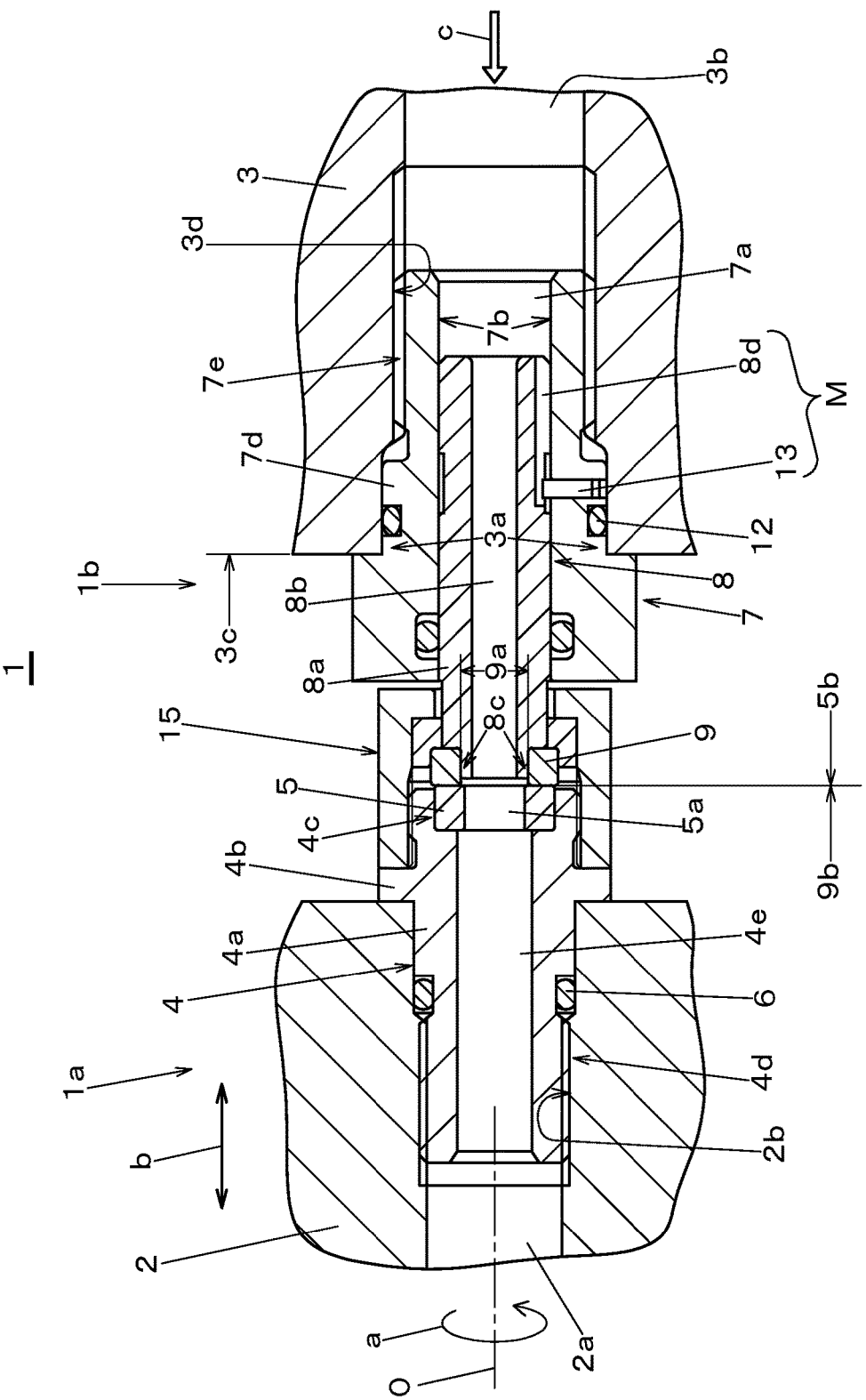
FIG. 1 is a cross-sectional view of a rotary joint in an embodiment 1 of the present invention.

Referring to FIG. 1, the overall configuration of a rotary joint 1 in an embodiment 1 will be explained. The rotary joint 1 shown in FIG. 1 is used in a fluid supply mechanism supplying fluid for cooling use to a spindle shaft of a machine tool or other shaft. A rotating part 1a provided with a rotating channel in the axial direction and a stationary part 1b provided with a stationary channel in the axial direction are arranged coaxially.

The rotating part 1a is fastened in a channel hole 2a of a shaft comprised of the spindle shaft 2. The spindle shaft 2 is driven to rotate by a motor built into the spindle and rotates about an axial center O (arrow mark "a"). The spindle shaft 2 performs an advancing/retracting operation in the axial direction by a clamp/unclamp cylinder (arrow mark "b"). The stationary part 1b is fastened and attached in an attachment hole 3a provided in the casing 3 communicating with the channel hole 3b through a housing member 7. The spindle shaft 2 is supported by a bearing at a frame (not shown) and passes through the frame. At the frame, bolts or other fastening means are used to detachably fasten the casing 3. At this time, the frame and the casing 3 are fastened so that the stationary part 1b is arranged coaxially with the rotating part 1a. The channel hole 3b provided at the casing 3 is supplied with fluid coolant or air for cooling use or other fluid from a fluid supply source (not shown, stationary side) (arrow mark "c").

Next, the detailed structure of the different parts will be explained. The rotating part 1a is comprised of spindle shaft 2 to which a rotor 4 is attached by screws as main components. The rotor 4 is comprised of a shaft part 4a at the end part at one side of which a flange part 4b with an outside diameter larger than the shaft part 4a is provided. Furthermore, at the shaft center part, a rotating channel 4e is provided in the axial direction. At the outer surface of the shaft part 4a, a male thread part 4d is provided. At the inner surface of the channel hole 2a, a female thread part 2b is provided. By screwing the male thread part 4d into the female thread part 2b, the rotor 4 is screwed with the spindle shaft 2 and the screwed part is sealed by an O-ring 6. Due to this, the rotating channel 4e is communicated with the channel hole 2a of the spindle shaft 2.

At the side end face of the right side of the rotor 4 (side facing stationary part 1b), a circular shaped recessed part 4c is formed in a manner surrounding the open surface of the rotating channel 4e, while a first seal ring 5 is fastened at the recessed part 4c. The first seal ring 5 is a ceramic or other hard material excellent in wear resistance shaped into a circular ring shape having an opening part 5a at the center part and is fastened to the recessed part 4c in the state with a smoothly finished first sealing surface 5b at the outer side. In this state, the rotating channel 4e communicates with the opening part 5a and opens at the first sealing surface 5b. In the above structure, the rotor 4 at which the first seal ring 5 is fastened is provided at the rotating part 1a and forms a rotating seal part having a first sealing surface 5b. The rotating channel 4e opens at the first sealing surface 5b.

Next, the structure of the stationary part 1b attached to the casing 3 will be explained. The stationary part 1b is provided with a shaft shaped floating seat 8 and a housing member 7. The floating seat 8 is attached to the housing member 7. At an attachment surface 3c of the casing 3, an attachment hole 3a provided communicating with the channel hole 3b is opened. A fitting projecting part 7d is provided extending from the cylindrical shaped housing member 7 forming the main body of the stationary part 1b. The fitting projecting part 7d is fit at the attachment hole 3a. The end part of the fitting projecting part 7d is formed with a male thread part 7e, while the inner surface of the channel hole 3b is provided with a female thread part 3d. By screwing the male thread part 7e into the female thread part 3d, the housing member 7 is screwed to the casing 3 and the stationary part is sealed by an O-ring 12.

The floating seat 8 has a stationary shaft part 8a formed with a stationary channel 8b running through it in the axial direction as its main part. At the end part of one side of the stationary shaft part 8a (in FIG. 1, the side facing the rotating part 1a), a seal attachment part 8c which is cut into the outer circumferential surface of the stationary shaft part 8a, is formed. At the seal attachment part 8c, a second seal ring 9 is fastened. The second seal ring 9 is comprised of a hard material similar to the first seal ring 5 formed into a circular ring shape having an opening part 9a at its center part. The second seal ring 9 is fastened to the seal attachment part 8c in a state with a smoothly finished second sealing surface 9b at the outer side (left side in FIG. 1). In this state, the stationary channel 8b opens at the second sealing surface 9b communicating with the opening part 9a.

The stationary shaft part 8a is fit into the fitting hole 7a provided running through the center part of the housing member 7 in the axial direction in a state where movement in the axial direction is allowed. That is, by setting the shapes and dimensions of the fitting hole 7a and the stationary shaft part 8a, a sliding clearance of a predetermined clearance dimension is secured between the inner circumferential surface 7b of the fitting hole 7a and the outer circumferential surface of the stationary shaft part 8a. With this configuration, the stationary shaft part 8a would be allowed to rotate inside the fitting hole 7a, so the rotating first sealing surface 5b would end up causing the second sealing surface 9b to rotate drawn long with it. For this reason, in the embodiment 1, the stationary part 1b side is provided with a rotation stopping mechanism M (see FIGS. 1 and 3) restricting relative rotation of the stationary shaft part 8a with respect to the fitting hole 7a about the axis. That is, at the fitting projecting part 7d of the housing member 7, a guide pin 13 for rotation stopping and guiding use is provided so as to stick out from the inner circumferential surface 7b of the fitting projecting part 7d. The guide pin 13 fits into a guide groove 8d provided in the axial direction at the outer circumferential surface of the upstream side of the stationary shaft part 8a. Due to this, relative rotation of the floating seat 8 with respect to the housing member 7 is restricted.

In the above structure, the floating seat 8 at which the second seal ring 9 is fastened has a stationary shaft part 8a. The stationary shaft part 8a is formed with a stationary channel 8b in the axial direction. The stationary shaft part 8a is fit in a fitting hole 7a provided in the housing member 7 of the stationary part 1b in a state allowing movement in the axial direction. The floating seat 8 serves as a stationary seal part having a second sealing surface 9b at which the stationary channel 8b is opened at the side end face of one side. In the present embodiment, the example of attaching the floating seat 8 to the casing 3 through the housing member 7 is shown, but the floating seat 8 may also be directly attached to the casing 3. In this case, the stationary shaft part 8a is fit into the fitting hole provided at the casing 3 of the stationary part 1b in a state allowing movement in the axial direction.

Next, the engagement part 15, having the function of allowing relative rotation of the above configured rotating seal part (rotor 4 to which first seal ring 5 is fastened) and stationary seal part (floating seat 8 to which second seal ring 9 is fastened) while stopping movement in the axial direction, will be explained. In a conventional rotary joint, the face seal is formed by using the fluid power of the fluid supplied to the stationary channel so as to make the stationary seal part move to the downstream side and make the stationary seal part push against the rotating seal part. On the other hand, in the present embodiment, the engagement part 15 stops movement of the rotating seal part and the stationary seal part in the axial direction and holds the state where the first sealing surface 5b and the second sealing surface 9b are made to abut facing each other.

Figure 2A:
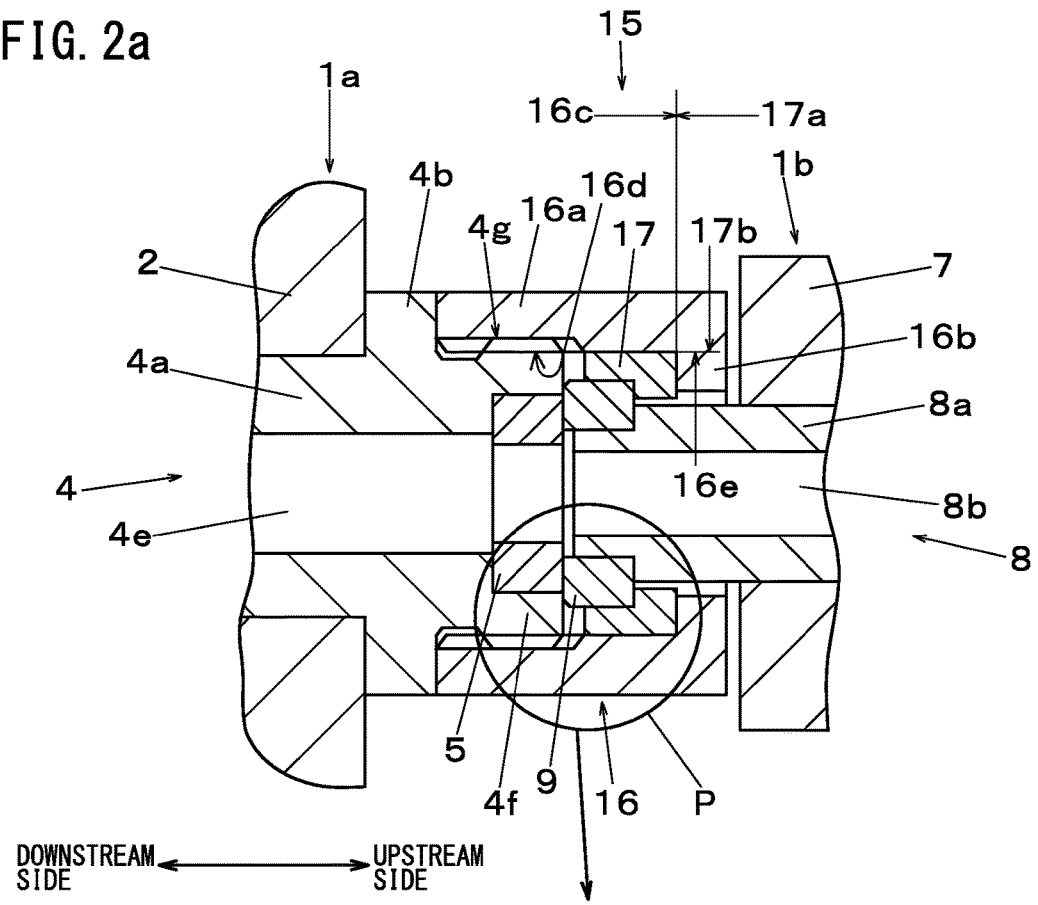
FIG. 2a is a partial cross-sectional view of a rotary joint in an embodiment 1 of the present invention.

As shown in FIG. 2a, the engagement part 15 has the connecting member 16 and the bearing member 17 as main components. The connecting member 16 has the function of restricting movement of the rotating seal part and the stationary seal part in the axial direction. In the present embodiment, the connecting member 16 is shaped as a cylindrical shape covered part 16a covering the face seal from the outer circumferential side and formed at the upstream side (right side in FIG. 2a) end part with a flange part 16b extending in the center direction. The bearing member 17 is interposed between the connecting member 16 and the stationary seal part and has the function of securing slidability at the time of relative rotation. The bearing member 17 is fabricated from SiC, alumina, carbon, or other material excellent in slidability and wear resistance. The bearing member 17 is made to abut against the inside surface 16c at the downstream side of the flange part 16b and the inner circumferential surface 16e of the covered part 16a respectively at the outside end face 17a and outer circumferential surface 17b and is fastened there by bonding, press-fitting, etc.

Figure 2B:
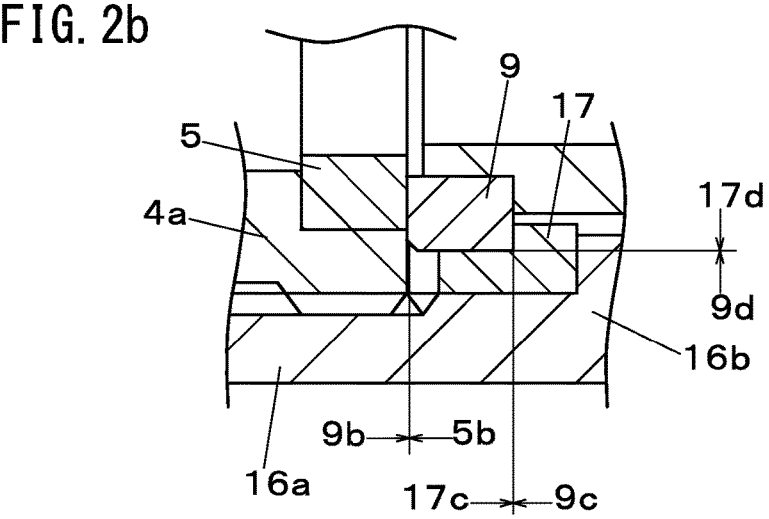

In the rotating part 1a, the outer circumference of the shaft end part 4f extending from the shaft part 4a to the upstream side (see FIG. 2a) is provided with a male thread part 4g. When attaching the connecting member 16 to the rotating seal part, the female thread part 16d provided at the inside surface of the covered part 16a is screwed with the male thread part 4g to fasten it while pushing the end part of the covered part 16a against the flange part 4b of the rotor 4. In this state, as shown by FIG. 2b of the details of the part P in FIG. 2a, the inside surface 17c of the bearing member 17 abuts against the side end face 9c of the second seal ring 9 and pushes it to the downstream side. Due to this, the second sealing surface 9b of the second seal ring 9 abuts against the first sealing surface 5b of the first seal ring 5 to form the face seal.

Figure 2C:
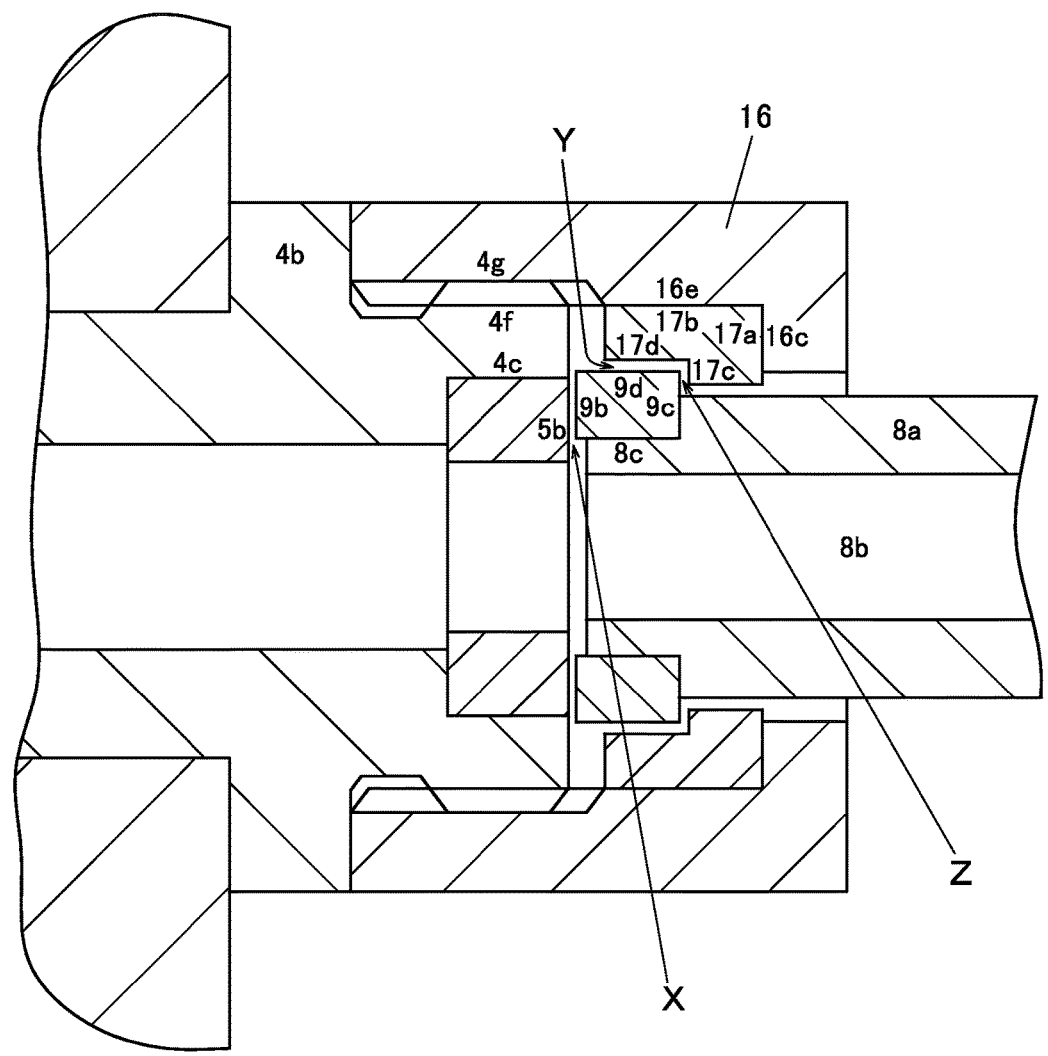

Simultaneously, the inside surface 17c of the bearing member 17 restricts separation of the first sealing surface 5b and the second sealing surface 9b. By the inner circumferential surface 17d of the bearing member 17 being fit with the second seal ring 9, two sliding surfaces Y and Z are formed between the inner circumferential surface 17d and the outer circumferential surface 9d and between the inside surface 17c and the side end face 9c. In FIG. 2c, the distance between the sliding surfaces X and Z is drawn exaggerated larger so as to make the rotating side (rotor 4, first seal ring 5, engagement part 16, and bearing member 17) and the non-rotating side (stationary shaft part 8a, second seal ring 9) easier to understand. The first sealing surface 5b of the first seal ring 5 rotates, the second sealing surface 9b of the second seal ring 9 does not rotate, and a sliding surface X is formed between the two.

That is, in this state, if the rotor 4 of the rotating part 1a rotates, the connecting member 16 rotates together with the bearing member 17. At this time, the floating seat 8 is restricted in rotation by the guide pin 13, so the stationary seal part comprised of the second seal ring 9 and the floating seat 8 is in a stopped state. The inner circumferential surface 17d and the outer circumferential surface 9d (sliding surface Y) and the inside surface 17c and side end face 9c (sliding surface Z) respectively slide, whereby the engagement part 15 allows relative rotation of the rotating seal part and stationary seal part while stopping movement in the axial direction.

The abutting state of the second sealing surface 9b and the first sealing surface 5b is defined by the object of use, the type of the fluid covered, the seal material, etc. It is suitably set in accordance with the desired seal properties of the face seal. That is, an abutting state where a slight clearance is formed between the second sealing surface 9b and the first sealing surface 5b or an abutting state such as a state where the second sealing surface 9b and the first sealing surface 5b intimately contact with a predetermined facial pressure or various other abutting states may be suitably selected.

In the above structure, the covered part 16a at which the male thread part 4g and female thread part 16d are provided serves as the rotating side fixing part fixed to the rotating seal parts 4, 5. The flange part 16b and the bearing member 17 are provided extending from the rotary side fixing part to the stationary seal part 8, 9 side. The flange part 16b and bearing member 17 abut against the stationary seal part thereby forming the rotating side abutting part restricting the separation of the first sealing surface 5b and the second sealing surface 9b. The bearing member 17 is provided at the rotating side abutting parts 16b, 17 at the abutting parts with the stationary seal parts 8, 9 and functions as the rotating side sliding member allowing relative rotation of the rotating seal part and the stationary seal part (see FIG. 2c).

Figure 3:
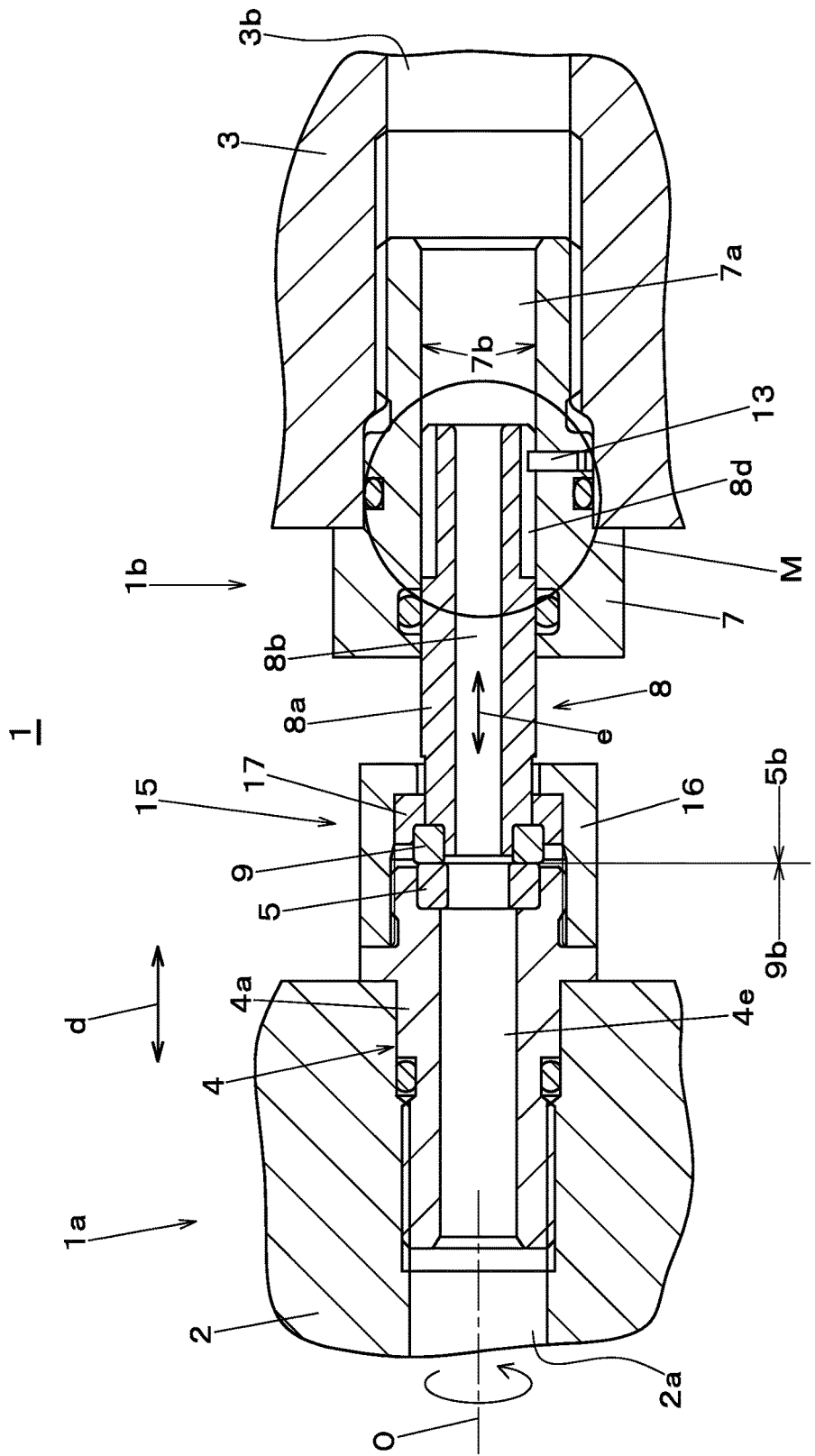
FIG. 3 is an explanatory view of the operation of a rotary joint in an embodiment 1 of the present invention.

FIG. 3 shows the operating state of the rotary joint 1. The engagement part 15 restrains movement of the rotating seal part and the stationary seal part, so the rotating part 1a advances and retracts (arrow mark "d") in the state where the face seal comprised of the first sealing surface 5b and the second sealing surface 9b abutting against each other, is formed. Due to this, the stationary shaft part 8a advances and retracts in the axial direction (arrow mark "e") together with the rotating part 1a in a non-rotating state. That is, in the rotary joint 1 shown in the present embodiment, the face seal comprised of the rotating seal part and the stationary seal part abutting against each other is constantly formed.

Due to this configuration, compared with the rotary joint of the prior art which made the stationary shaft part slide when starting the operation of supplying fluid from the stationary seal part to the rotating seal part, the following excellent effect is obtained. That is, in the prior art, at the time of start of operation, until the stationary shaft part moved and the face seal was formed, fluid would unavoidably massively disperse and particles would fly out to the outside. On the contrary, in the rotary joint 1 shown in the present embodiment, since the face seal is always formed, no massive leakage or spray of fluid due to supply of fluid in the state where the sealing surfaces are opened will occur.

Further, in the prior art, if sludge or other foreign matter deposited in the sliding clearance of the stationary shaft part, abnormal operation would result due to the poor sliding action. If trying to prevent such poor sliding action, it would be necessary to secure the drive force for making the stationary shaft part slide. If making the stationary shaft slide by a sufficient drive pressure, the seal members would be liable to be damaged due to the impact at the time of closing the sealing surfaces due to the high speed movement of the stationary shaft part or the excessive sealing surface pressure. On the contrary, in the rotary joint 1 shown in the present embodiment, the stationary shaft part 8a always advances and retracts along with the spindle shaft 2, so abnormal operation never occurs due to poor sliding action. Further, in the present embodiment, there is no need to consider the drive force due to the fluid pressure for the sliding action of the end face of the stationary shaft part, so it is possible to sufficiently secure the inside diameter of the stationary channel 8b in the stationary shaft part 8a and reduce the flow resistance.

Furthermore, in the prior art, in the state where the face seal was formed, the stationary shaft part was in a cantilever state held in the fitting hole at one side. The problem easily arose of the slight vibration occurring at the sealing surfaces, which causes wear of the sealing surfaces. On the other hand, in the rotary joint 1 shown in the present embodiment, the stationary shaft part 8a is held in the fitting hole at the upstream side end part while the downstream side end part is held by the engagement part 15, that is, both ends are held. Due to this, the wear of the sealing surfaces due to the occurrence of fine vibration at the face seal is reduced.

FIG. 4 shows the procedure when attaching the rotating part 1a to the stationary part 1b to assemble the rotary joint 1 in the rotary joint 1 shown in the present embodiment. In the present embodiment 1, the assembly is performed in the state where the floating seat 8 is held by the engagement part 15 at the rotating part 1a side. In this case, when inserting the shaft end part 8e of the stationary shaft part 8a into the fitting hole 7a (arrow mark "f"), it is necessary that a guide groove 8d formed at the stationary shaft part 8a and the guide pin 13 provided at the inner circumferential surface 7b of the fitting hole 7a match in positions in the rotational direction about the axis. At the time of assembly work of the art with no engagement part 15, since the floating seat 8 was provided alone, a worker was able to freely adjust the position of the stationary shaft part 8a in the rotational direction about the axis while fitting it into the fitting hole 7a. Therefore, in assembly work in the art, it was easy to match the positions of a guide groove 8d and the guide pin 13 in the rotational direction about the axis.

However, in the present embodiment 1, the rotating part 1a and the stationary part 1b are assembled in a state where the stationary shaft part 8a is held at the rotating part 1a side in advance by the engagement part 15. In this configuration, an assembly worker would have an extremely difficult time in adjusting the position of the stationary shaft part 8a in the rotational direction about the axis. For this reason, in the present embodiment 1, by configuring the rotation stopping mechanism M shown in FIG. 1 and FIG. 3 in the following way, the work efficiency when attaching the rotating part 1a to the stationary part 1b to assemble the rotary joint 1 is improved.

Figure 5A:
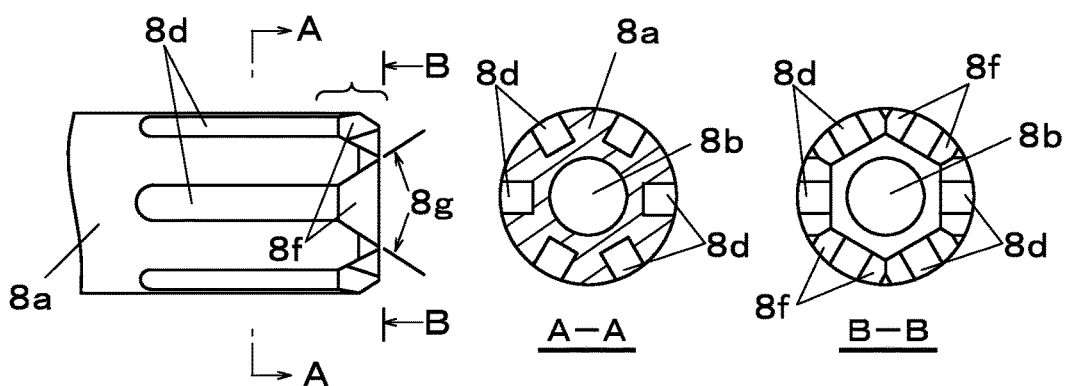
FIG. 5a is a front view, cross-sectional view of the line A-A, and a side view seen from a direction B-B of a shaft side engagement part of a rotation stopping mechanism M assembled in a rotary joint in an embodiment 1 of the present invention.

FIG. 5a shows the detailed shape of the shaft end part 8e of the stationary shaft part 8a. At the outer circumferential surface of the shaft end part 8e, a plurality of (here, six equally arranged) guide grooves 8d (groove parts) are formed in the axial direction as the shaft side engagement part provided at the stationary shaft part 8a (see cross-section A-A). The shaft end sides of the respective guide grooves 8d communicate with bottom flaring shaped guides 8f. The inside surfaces of the guide grooves 8d connect with the guide surfaces 8g which open flaring outward.

Figure 5B:
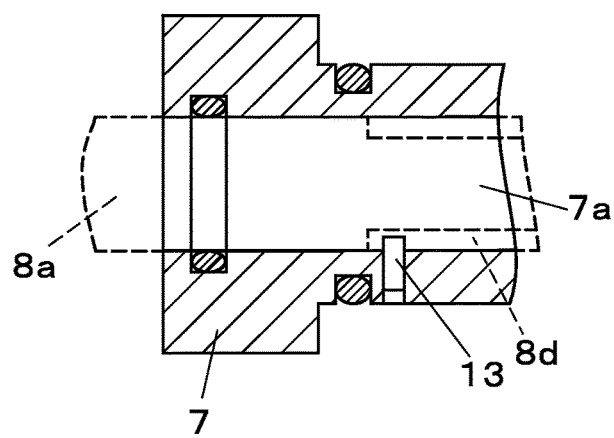
FIG. 5b is an explanatory view of a hole side engagement part of a rotation stopping mechanism M assembled in a rotary joint in an embodiment 1 of the present invention.

As shown in FIG. 5b, the outer circumferential surface of the fitting hole 7a of the housing member 7 is provided with a hole side engagement part comprised of a guide pin 13 sticking out from it. If the stationary shaft part 8a is fit in the fitting hole 7a of the housing member 7, one of the plurality of guide grooves 8d formed at the shaft end part 8e engages with the guide pin 13, whereby the relative rotation of the stationary shaft part 8a is restricted. That is, by the guide pin 13 being provided at the inner circumferential surface of the fitting hole 7a and engaging with the shaft side engagement part comprised of any of the plurality of guide grooves 8d, a rotation stopping use projecting part which restricts the relative rotation of the stationary shaft part 8a, is formed. In the above case, the example is shown where the rotation stopping projecting part used is a guide pin 13, but the rotation stopping projecting part may be a member other than a pin such as a key shaped member so long as configured to engage with a guide groove 8d and restrict rotation of the stationary shaft part 8a.

Figure 5C:
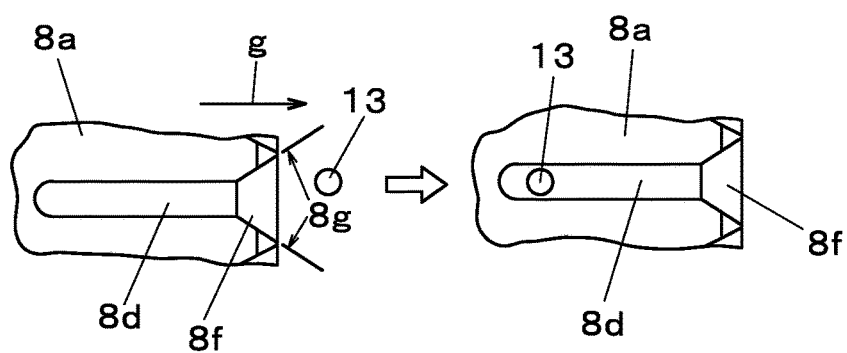
FIG. 5c is an explanatory view of a rotation stopping mechanism M assembled in a rotary joint in an embodiment 1 of the present invention.

FIG. 5c shows the guide action of a guide part 8f and guide surfaces 8g in the case of making the stationary shaft part 8a at any relative rotation position with respect to the guide pin 13 at the fitting hole 7a fit with the fitting hole 7a. That is, in the operation of making the stationary shaft part 8a move in the arrow mark "g" direction to fit in the fitting hole 7a, the position of the guide pin 13 in the rotational direction about the axis does not necessarily have to match one of the guide grooves 8d. Usually, the guide pin 13 and the guide grooves 8d are offset in position.

In such a case as well, in the operation where the shaft is fit in, a guide surface 8g of a guide part 8f abut against the guide pin 13. Due to this, a force in the rotational direction acts on the stationary shaft part 8a so that a guide groove 8d corresponding to the guide part 8f matches the position of the guide pin 13. In the state where the stationary shaft part 8a has finished being fit into the fitting hole 7a, the guide pin 13 is engaged with one guide groove 8d whereby relative rotation of the stationary shaft part 8a with respect to the fitting hole 7a is restricted.

In the operation of fitting the stationary shaft part 8a in the fitting hole 7a, a guide part 8f at which the guide surfaces 8g are provided has the function of an engagement guide part which guides and engages a hole side engagement part, i.e., the guide pin 13 to and with a shaft side engagement part, i.e., a guide groove 8d. In the example of FIGS. 5a to 5c, an engagement guide part is provided at the shaft end part 8e of the stationary shaft part 8a for each of the plurality of guide grooves 8d (groove parts). The engagement guide part is comprised of the guide surfaces 8g guiding a rotation stopping projecting part comprised of the guide pin 13 to a guide groove 8d in the operation of fitting the shaft.

As the configuration of the rotation stopping mechanism M, various types of variations are possible aside from the configuration shown in FIGS. 5a to 5c, if the configuration has a shaft side engagement part provided at the stationary shaft part 8a, a hole side engagement part provided at the fitting hole 7a wherein the hole side engagement part engages with the shaft side engagement part to thereby restricts relative rotation, and an engagement guide part guiding and engaging the shaft side engagement part to and with the hole side engagement part in the operation of fitting the shaft. Below, examples of variations of these, that is, the rotation stopping mechanism MA and the rotation stopping mechanism MB, will be explained.

Figure 6A:
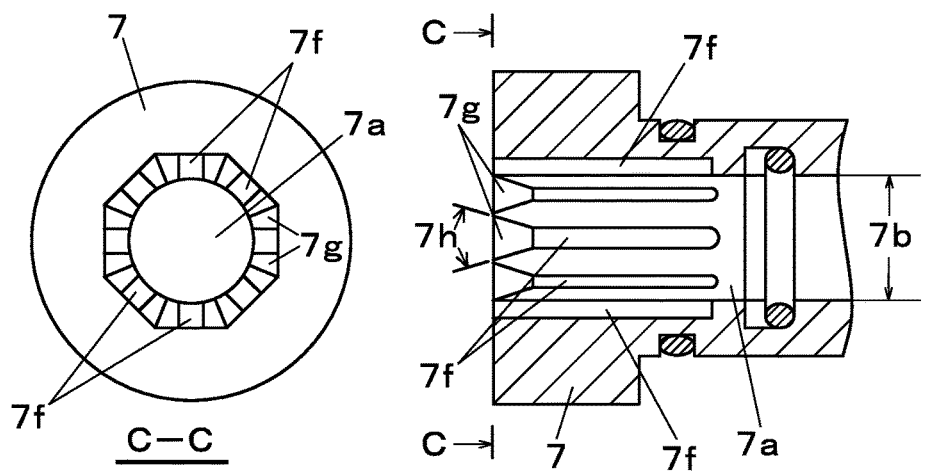
FIG. 6a is a cross-sectional view and a side view seen from the C-C direction of a hole side engagement part of a rotation stopping mechanism MA assembled in a rotary joint in an embodiment 1 of the present invention.

First, the rotation stopping mechanism MA will be explained with reference to FIGS. 6a to 6c. FIG. 6a shows the details of an inner circumferential surface 7b of a fitting hole 7a provided at the housing member 7. At the inner circumferential surface 7b of the fitting hole 7a, a plurality of (here, six equally arranged) guide grooves 7f (groove parts) are formed in the axial direction as hole side engagement parts provided at the fitting hole 7a (see side view of arrow mark C-C). The open end sides of the respective guide grooves 7f form bottom flaring shape guide parts 7g. The inside surfaces of the guide grooves 7f are connected with the guide surfaces 7h which open flaring outward.

Figure 6B:
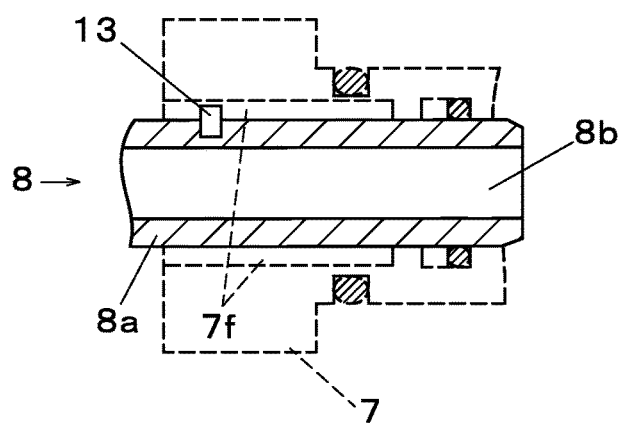
FIG. 6b is an explanatory view of a shaft side engagement part of a rotation stopping mechanism MA assembled in a rotary joint in an embodiment 1 of the present invention.

As shown in FIG. 6b, at the outer circumferential surface of the stationary shaft part 8a, a shaft side engagement part comprised of the guide pin 13 is provided sticking out. In the state where the stationary shaft part 8a is fit with the fitting hole 7a of the housing member 7, one of the plurality of guide grooves 7f formed at the inner circumferential surface 7b engages with the guide pin 13. Due to this, relative rotation of the stationary shaft part 8a is restricted. That is, the guide pin 13 is provided at the outer circumferential surface of the stationary shaft part 8a and engages with a hole side engagement part comprised of one of the plurality of guide grooves 7f. Due to this, the guide pin 13 serves as a rotation stopping projecting part restricting the relative rotation of the stationary shaft part 8a. In the above case, the example is shown of the rotation stopping use projecting part used being a guide pin 13, but the rotation stopping projecting part may also be a member other than a pin such as a key shaped member so long as configured to engage with a guide groove 7f and restrict rotation of the stationary shaft part 8a.

Figure 6C:
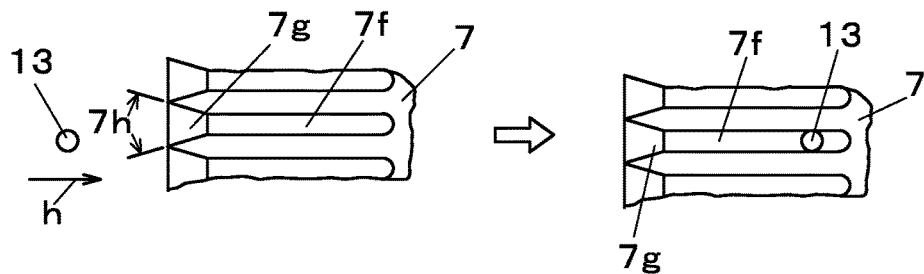
FIG. 6c is an explanatory view of a rotation stopping mechanism MA assembled in a rotary joint in an embodiment 1 of the present invention.

FIG. 6c shows the guide action of a guide part 7g and guide surfaces 7h in the case of fitting a stationary shaft part 8a at any rotational position relative to the guide pin 13 in the stationary shaft part 8a into the fitting hole 7a. That is, in the operation of making the guide pin 13 move along with the stationary shaft part 8a in the arrow mark "h" direction to fit the part into the fitting hole 7a, the position of the guide pin 13 in the rotational direction about the axis does not always match any of the guide grooves 7f. Usually, the guide pin 13 and the guide grooves 7f are off in position.

Even in such a case, in the operation of fitting the shaft, a guide surface 7h of a guide part 7g abuts against the guide pin 13. Due to this, a force in a rotational direction acts on the stationary shaft part 8a so that the guide groove 7f corresponding to the guide part 7g matches the position of the guide pin 13. In the state where the stationary shaft part 8a has finished being fit into the fitting hole 7a, the guide pin 13 is engaged with one guide groove 7f whereby relative rotation of the stationary shaft part 8a with respect to the fitting hole 7a is restricted.

That is, a guide part 7g at which the guide surfaces 7h is provided has the function of an engagement guide part which guides and engages a shaft side engagement part comprised of the guide pin 13 to and with a hole side engagement part comprised of a guide groove 7f in the shaft fitting operation of fitting the stationary shaft part 8a in the fitting hole 7a. In the example shown in FIGS. 6a to 6c, an engagement guide part is provided at the open end part of the fitting hole 7a for each of the plurality of guide grooves 7f (groove parts). The engagement guide part is comprised of the guide surfaces 7h guiding a rotation stopping projecting part comprised of the guide pin 13 to a guide groove 7f in the operation of fitting the shaft.

Figure 7A:
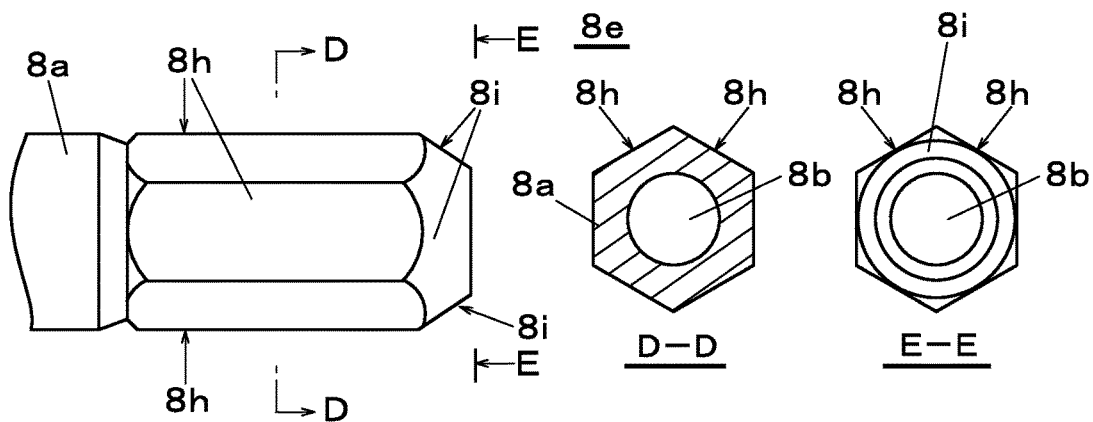
FIG. 7a is a front view, cross-sectional view along the D-D line, and side view seen from the E-E direction of a shaft side engagement part of a rotation stopping mechanism MB assembled in a rotary joint in an embodiment 1 of the present invention.

Next, the rotation stopping mechanism MB will be explained with reference to FIGS. 7a to 7c. As shown in FIG. 7a, the shaft end part of the stationary shaft part 8a is worked to a polygonal cross-section (here, a hexagonal cross-section). At the outer circumferential surface, a plurality of (six) flat parts 8h (see cross-sectional view along the D-D line) are formed in the axial direction as shaft side engagement parts. The shaft end sides of the flat parts 8h connect with a drawn bottom tapering shape guide surface 8i in a tapered manner or gently curved manner.

Figure 7B:
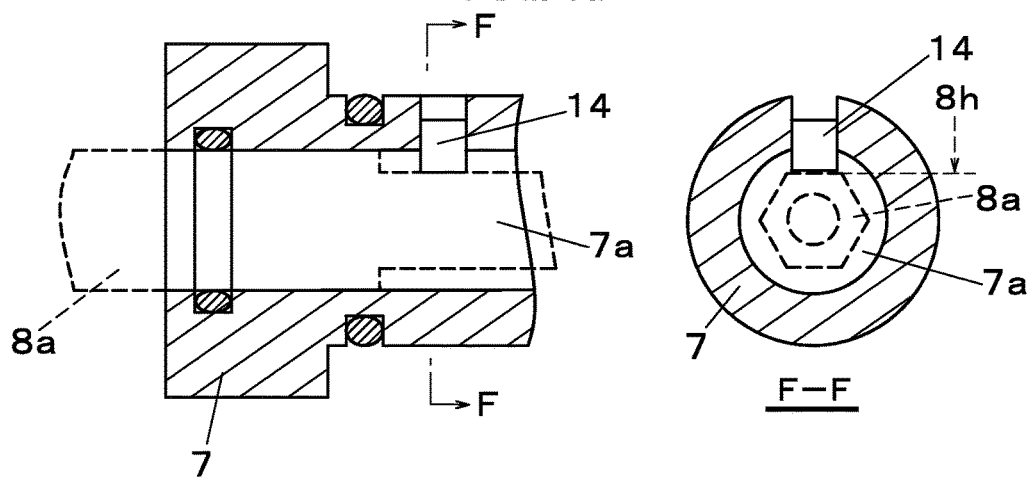
FIG. 7b is a cross-sectional view and cross-sectional view along the F-F line of a hole side engagement part of a rotation stopping mechanism MB assembled in a rotary joint in an embodiment 1 of the present invention.

As shown in FIG. 7b, at the inner circumferential surface of the fitting hole 7a of the housing member 7, a hole side engagement part comprised of an abutting member 14 is provided. In the state where the stationary shaft part 8*a* is fit in the fitting hole 7*a*, the abutting member 14 sticking out from the inner circumferential surface of the fitting hole 7*a* abuts and engages against and with one of the flat parts 8*h*, whereby relative rotation of the stationary shaft part 8*a* with respect to the fitting hole 7*a* is restricted. That is, the abutting member 14 abuts and engages against and with a shaft side engagement part comprised of any of the plurality of flat parts 8*h* provided at the inner circumferential surface of the fitting hole 7*a*. Due to this, relative rotation of the stationary shaft part 8*a* with respect to the fitting hole 7*a* is restricted.

Figure 7C:
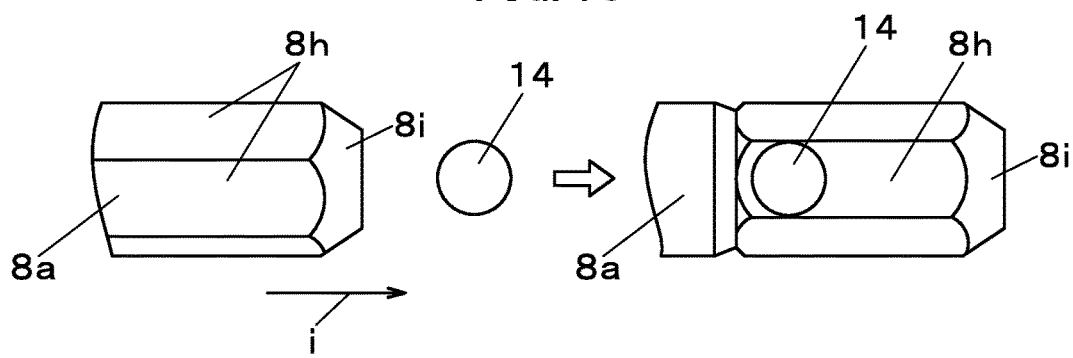
FIG. 7c is an explanatory view of a rotation stopping mechanism MB assembled in a rotary joint in an embodiment 1 of the present invention.

FIG. 7*c* shows the guide action of the guide surface 8*i* in the case of fitting a stationary shaft part 8*a* at any rotational position relative to the abutting member 14 into the fitting hole 7*a* into the fitting hole 7*a*. That is, in the operation of making the stationary shaft part 8*a* move in the arrow mark "i" direction to fit it into the fitting hole 7*a*, the position of the abutting member 14 in the rotational direction about the axis does not always match one of the flat parts 8*h*. Usually, the abutting member 14 and the flat parts 8*h* are off in position.

Even in such a case, by making the bottom tapering shape guide surface 8*i* abut against the abutting member 14, a force in the rotation direction acts on the stationary shaft part 8*a* so that the nearest flat part 8*h* matches the position of the abutting member 14 in the operation of fitting the shaft. Due to this, in the state where the stationary shaft part 8*a* has finished being fit in, the abutting member 14 abuts and engages with one flat part 8*h* whereby relative rotation of the stationary shaft part 8*a* with respect to the fitting hole 7*a* is restricted.

That is, the bottom tapering shape guide surface 8*i* functions as an engagement guide part guiding and engaging a hole side engagement part comprised of the abutting member 14 to and with a shaft side engagement part comprised of a flat part 8*h* in the operation of fitting the stationary shaft part 8*a* in the fitting hole 7*a*. In the example shown in FIGS. 7*a* to 7*c*, the engagement guide part is provided at the shaft end part 8*e* of the stationary shaft part 8*a*. The engagement guide part is comprised of the guide surface 8*i* guiding the abutting member 14 to a flat part 8*h* in the operation of fitting the shaft.

Embodiment 2

Next, referring to FIG. 8, the overall configuration of a rotary joint 101 in an embodiment 2 will be explained. The rotary joint 101 is used for applications similar to the rotary joint 1 in the embodiment 1. A rotating part 101*a* provided with a rotating channel in the axial direction and a stationary part 101*b* provided with a stationary channel in the axial direction are arranged coaxially. In the rotary joint 101 of the present embodiment 2, a floating seat 108 is provided at the rotating part 101*a* instead of the stationary part 1*b* of the embodiment 1.

Figure 8:
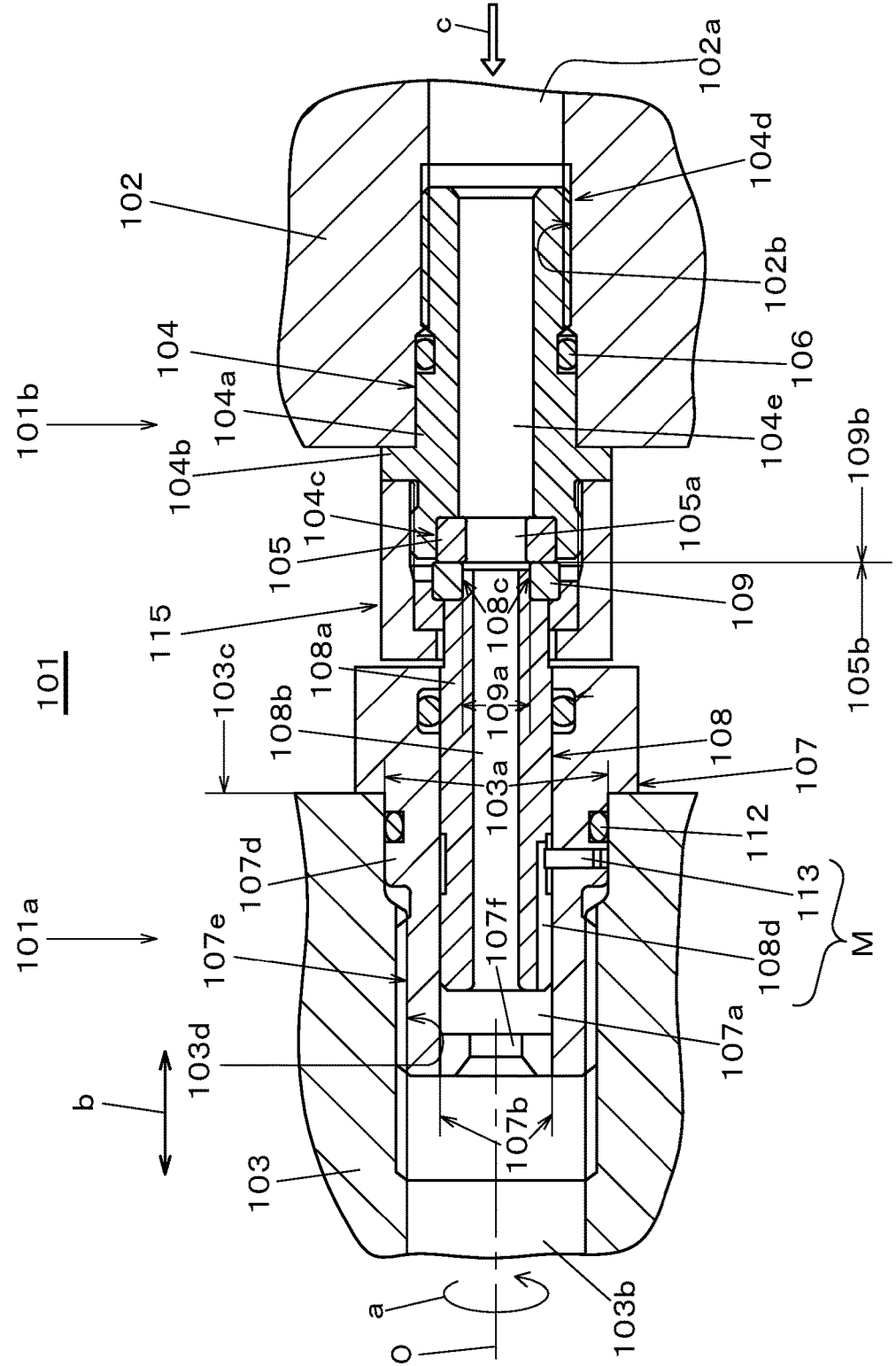
FIG. 8 is a cross-sectional view of a rotary joint in an embodiment 2 of the present invention.

In FIG. 8, the rotating part 101*a* is fastened to a shaft comprised of a spindle shaft 103. The spindle shaft 103 is driven to rotate by a motor built in the spindle and rotates about an axial center O (arrow mark a). The spindle shaft 103 advances and retracts in operation in the axial direction by a clamp/unclamp cylinder (arrow mark "b"). The stationary part 101*b* is fastened and attached to a channel hole 102*a* provided at the casing 102 through a holding member 104. A frame through which the spindle shaft 103 is inserted (not shown) is detachably fastened to a casing 102 by bolts or other fastening means. The stationary part 101*b* is arranged coaxially with the rotating part 101*a*. The channel hole 102*a* is supplied with fluid coolant or air for cooling use or another fluid from a fluid supply source (not shown) (arrow mark "c").

Next, the detailed structures of the different parts will be explained. The stationary part 101*b* comprises the casing 102 to which the holding member 104 is attached as main parts. The holding member 104 is provided with a flange part 104*b* with an outside diameter larger than the stationary shaft part 104*a* at the end part of one side of the stationary shaft part 104*a*. Furthermore, the shaft center part is provided with a stationary channel 104*e* in the axial direction. The outside surface of the stationary shaft part 104*a* is provided with a male thread part 104*d*, while the inside surface of the channel hole 102*a* is provided with a female thread part 102*b*. By screwing the male thread part 104*d* into the female thread part 102*b*, the holding member 104 is screwed to the casing 102 and the screwed part is sealed by an O-ring 106. Due to this, the stationary channel 104*e* communicates with the channel hole 102*a* of the casing 102.

At the side end face of the left side of the holding member 104 (side facing rotating part 101*a*), a circular recessed part 104*c* is formed in a manner surrounding the opening surface of the stationary channel 104*e*. At the recessed part 104*c*, a first seal ring 105 is fastened. The first seal ring 105 is similar to the first seal ring 5 in the embodiment 1. It is fastened to the recessed part 104*c* in the state with a smoothly finished first sealing surface 105*b* at the outer side. In this state, the stationary channel 104*e* communicates with the opening part 105*a* and opens at the first sealing surface 105*b*. In the above structure, the holding member 104 to which the first seal ring 105 is fastened is provided at the stationary part 101*b* and serves as the stationary seal part having the first sealing surface 105*b*. At the first sealing surface 105*b*, the stationary channel 104*e* opens.

Next, the structure of the rotating part 101*a* attached to the spindle shaft 103 will be explained. The rotating part 101*a* is provided with a shaft shaped floating seat 108 and rotor 107. The floating seat 108 is attached to the rotor 107. At the attachment surface 103*c* of the spindle shaft 103, an attachment hole 103*a* provided communicating with the channel hole 103*b* is opened. A fitting projecting part 107*d* is provided extending from the cylindrical shape rotor 107 forming the main body of the rotating part 101*a*. The attachment hole 103*a* has a fitting projecting part 107*d* fit into it. The end part of the fitting projecting part 107*d* is formed with a male thread part 107*e*, while the inner surface of the channel hole 103*b* is provided with a female thread part 103*d*. By screwing the male thread part 107*e* into the female thread part 103*d*, the rotor 107 is screwed to the spindle shaft 103 and the screwed part is sealed by the O-ring 112.

The floating seat 108 has a shaft part 108*a* formed with a rotating channel 108*b* running through it in the axial direction as a main part. At the end part of one side of the shaft part 108*a* (in FIG. 8, side facing stationary part 101*b*), a seal attachment part 108*c* cut into the outer circumferential surface of the shaft part 108*a* is formed. At the seal attachment part 108*c*, a second seal ring 109 is fastened. The second seal ring 109 is comprised of a hard material similar to the first seal ring 105 and shaped in a circular ring shape having an opening part 109*a* at its center part. The second seal ring 109 is fastened to the seal attachment part 108*c* in a state with the smoothly finished second sealing surface 109*b* at the outer side. In this state, the rotating channel 108*b* communicates with the opening part 109*a* and opens at the second sealing surface 109*b*.

The shaft part 108*a* is fit into the fitting hole 107*a* provided running through the center part of the rotor 107 in the axial direction in a state where movement in the axial direction is allowed. That is, by setting the shapes and dimensions of the fitting hole 107*a* and the shaft part 108*a*, a sliding clearance of a predetermined clearance dimension is secured between the inner circumferential surface 107*b* of the fitting hole 107*a* and the outer circumferential surface of the shaft part 108*a*. With this configuration, the shaft part 108*a* would be allowed to rotate inside the fitting hole 107*a*, so the shaft part 108*a* would rotate relative to the fitting hole 107*a*. For this reason, in the embodiment 2, the rotating part 101*a* side is provided with a rotation stopping mechanism M (see FIGS. 8 and 10) restricting relative rotation of the shaft part 108*a* with respect to the fitting hole 107*a* about the axis. That is, at the fitting projecting part 107*d* of the rotor 107, a guide pin 113 for rotation stopping and guiding use is provided so as to stick out from the inner circumferential surface 107*b* of the fitting projecting part 107*d*. The guide pin 113 fits into a guide groove 108*d* provided in the axial direction at the outer circumferential surface of the upstream side of the stationary shaft part 108*a*. Due to this, relative rotation of the floating seat 108 with respect to the housing member 107 is restricted.

In the above structure, the floating seat 108 to which the second seal ring 109 is fastened has a shaft part 108*a*. The shaft part 108*a* is formed with a rotating channel 108*b* in the axial direction. The shaft part 108*a* is fit in a fitting hole 107*a* provided at the rotor 107 of the rotating part 101*a* in a state allowing movement in the axial direction. The floating seat 108 serves as the rotating seal part having the second sealing surface 109*b* at which the rotating channel 108*b* opens at the side end face of one side. In the present embodiment, the example of attachment of the floating seat 108 to the spindle shaft 103 through the rotor 107 is shown, but the floating seat 108 may be directly attached to the spindle shaft 103. In this case, the shaft part 108*a* is fit into the fitting hole provided at the spindle shaft 103 of the rotating part 101*a* in a state where movement in the axial direction is allowed.

Next, the engagement part 115, having the function of allowing relative rotation of the above configured stationary seal part (holding member 104 to which first seal ring 105 is fastened) and the rotating seal part (floating seat 108 to which second seal ring 109 is fastened) while stopping movement in the axial direction, will be explained. In a conventional rotary joint, the fluid power of the fluid supplied to the stationary channel makes the stationary seal part move to the downstream side and pushes the stationary seal part against the rotating seal part to thereby form a face seal. On the other hand, in the present embodiment, the engagement part 115 stops movement of the rotating seal part and the stationary seal part in the axial direction and holds a state where the first sealing surface 105*b* and the second sealing surface 109*b* are made to abut facing each other.

Figure 9A:
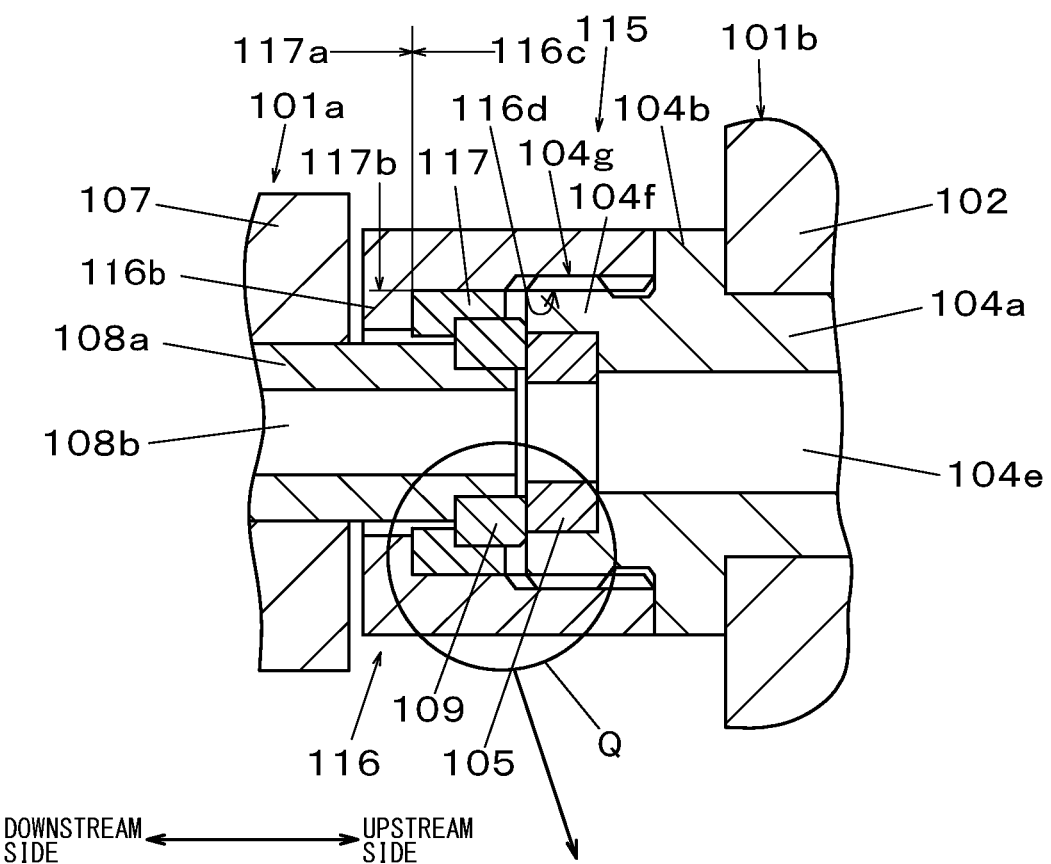
FIG. 9a is a partial cross-sectional view of a rotary joint in an embodiment 2 of the present invention.

As shown in FIG. 9*a*, the engagement part 115 comprises a connecting member 116 and a bearing member 117 as main parts. The connecting member 116 has the function of restricting movement in the axial direction of the rotating seal part and the stationary seal part. In the present embodiment, the end part of the downstream side (left side in FIG. 9*a*) of the cylindrical shape covered part 116*a* covering the face seal from the outer circumferential side is of a shape formed with a flange part 116*b* extending in the center direction. The bearing member 117 is interposed between the connecting member 116 and the stationary seal part and has the function of securing the slidability at the time of relative rotation. The material of the bearing member 117 is similar to the bearing member 17 in the embodiment 1. The bearing member 117 is made to abut against the inside surface 116*c* of the downstream side of the flange part 116*b* and the inner circumferential surface of the covered part 116*a* at the respective outside end face 117*a* and outer circumferential surface 117*b* and is fastened there by bonding, press-fitting, or another method.

Figure 9B:
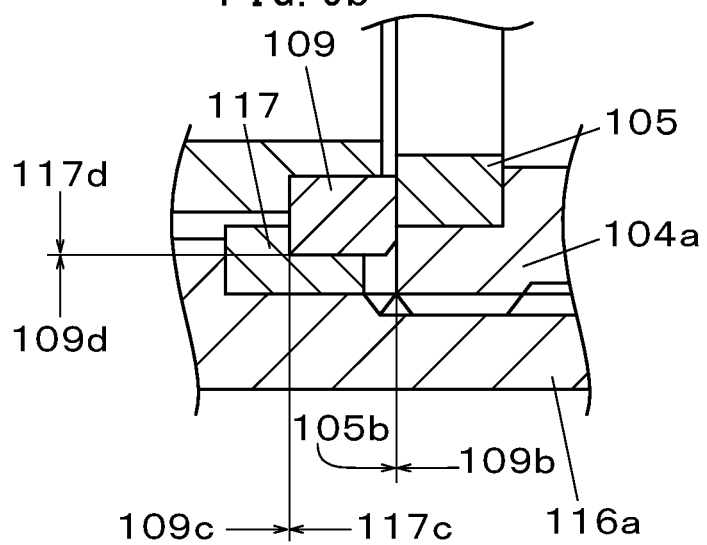

In the stationary part 101*b*, the outer circumference of the shaft end part 104*f* (see FIG. 9*a*) extending from the stationary shaft part 104*a* to the downstream side is provided with the male thread part 104*g*. When attaching the connecting member 116 to the stationary seal part, a female thread part 116*d* provided at the inner surface of the covered part 116*a* is screwed with the male thread part 104*g* to fasten it while pushing the end part of the covered part 116*a* against the flange part 104*b* of the holding member 104. In this state, as shown in FIG. 9*b* of the details of the part Q in FIG. 9*a*, the inside surface 117*c* of the bearing member 117 abuts against the side end face 109*c* of the second seal ring 109 and pushes against the downstream side. Due to this, the second sealing surface 109*b* of the second seal ring 109 abuts against the first sealing surface 105*b* of the first seal ring 105 to form the face seal. At the same time, the inside surface 117*c* of the bearing member 117 restricts separation of the first sealing surface 105*b* and the second sealing surface 109*b*. At the inner circumferential surface 117*d* of the bearing member 117, by the second seal ring 109 being fit in, two sliding surfaces are formed between the inner circumferential surface 117*d* and outer circumferential surface 109*d* and the inside surface 117*c* and side end face 109*c*.

That is, if, in this state, the rotor 107 of the rotating part 101*a* rotates, since the floating seat 108 is restricted in relative rotation with the rotor 107 by the guide pin 113, the rotating seal part comprised of the second seal ring 109 and the floating seat 108 rotates together with the rotor 107. The connecting member 116 fastened to the holding member 104 is in a state stopped from rotating together with the bearing member 117. At this time, the inner circumferential surface 117*d* and the outer circumferential surface 109*d* and the inside surface 117*c* and the side end face 109*c* slide against each other, whereby the engagement part 115 allows relative rotation between the rotating seal part and the stationary seal part while stopping movement in the axial direction.

The abutting state of the second sealing surface 109*b* and the first sealing surface 105*b* is suitably set in accordance with the desired seal properties of the face seal defined by the object of use, type of the fluid covered, seal material, etc. That is, it is possible to suitably select an abutting state where a slight clearance is formed between the second sealing surface 109*b* and the first sealing surface 105*b*, an abutting state where the second sealing surface 109*b* and the first sealing surface 105*b* are in a state of intimate contact with a predetermined surface pressure value, and other various types of abutting states.

In the above structure, the covered part 116*a* at which the male thread part 104*g* and the female thread part 116*d* are provided becomes the stationary side fixing part fixed to the stationary seal part. The flange part 116*b* and the bearing member 117 are provided extending from this stationary side fixing part to the rotating seal part side. The flange part 116*b* and the bearing member 117 forms a stationary side abutting part abutting against the rotating seal part and restricting separation of the first sealing surface 105*b* and the second sealing surface 109*b*. The bearing member 117 is provided at the abutting part with the rotating seal part at this stationary side abutting part and functions as a stationary side sliding member allowing relative rotation of the rotating seal part and the stationary seal part.

Figure 10:
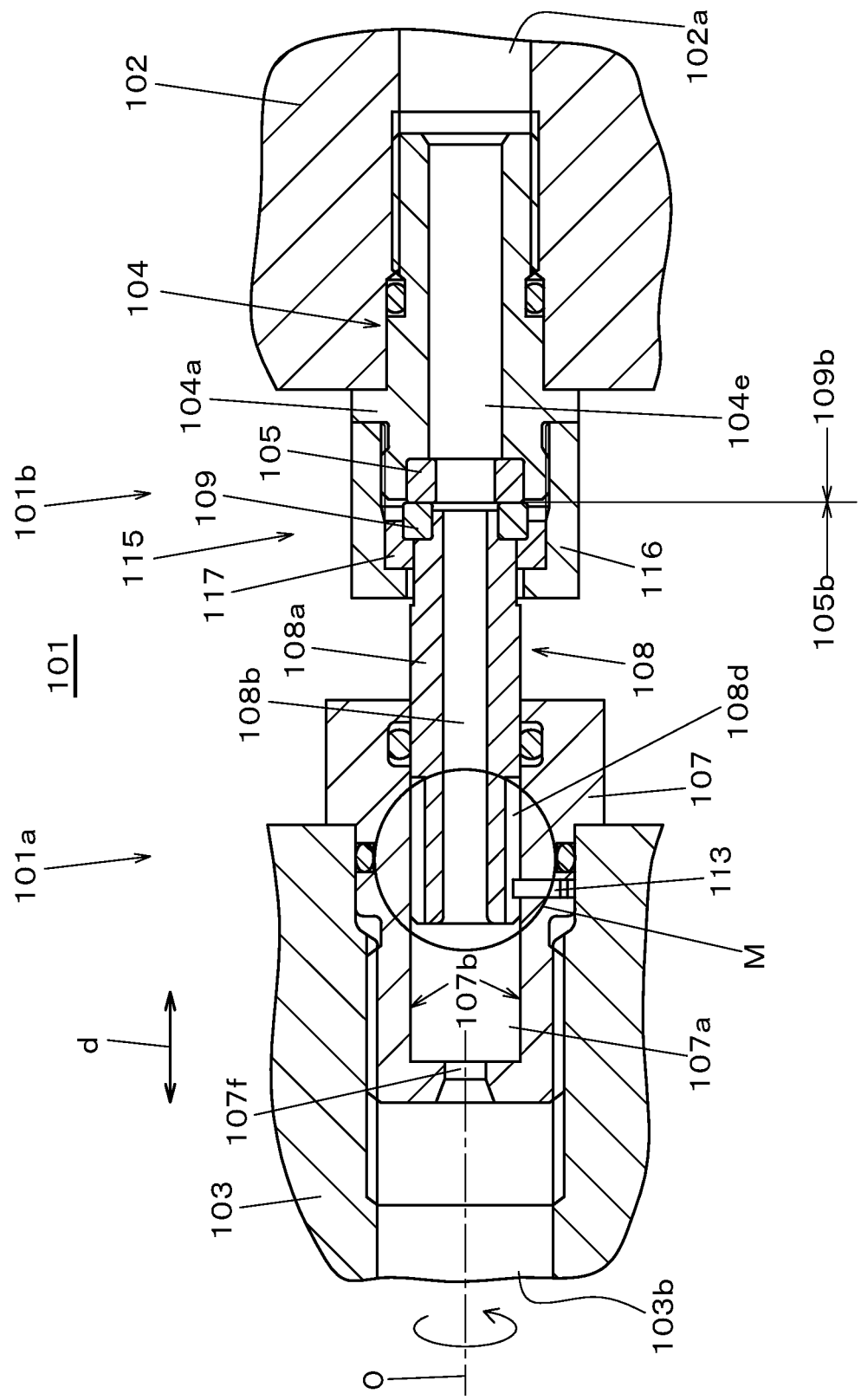
FIG. 10 is an explanatory view of the operation of a rotary joint in an embodiment 2 of the present invention.

FIG. 10 shows the operating state of the rotary joint 101. The engagement part 115 is used for engagement of the rotating seal part and the stationary seal part, so in the state where the face seal where the first sealing surface 105*b* and the second sealing surface 109*b* are made to abut is formed, the rotating part 101*a* is made to advance and retract (arrow mark "d"). Due to this, the rotating part 101*a* is locked with the stationary seal part and advances and retracts in the axial direction with respect to the shaft part 108*a* in the stopped state (shaft part 108*a* to which second sealing surface 109*b* is fastened rotates without changing in axial direction position). That is, in the rotary joint 101 shown in the present embodiment, a face seal comprised of the rotating seal part and the stationary seal part made to abut against each other is constantly formed. Due to this, a similar effect is obtained as the rotary joint 1 shown in the embodiment 1.

Furthermore, in the rotary joint 101 of the present embodiment 2, a floating seat 108 is provided at the rotating part 101*a* side and rotates together with the rotor 107, so the shaking of the shaft part 108*a* about the axis due to the gyro effect accompanying rotational motion is lightened. Due to this, the occurrence of fine vibration at the face seal where the first sealing surface 105*b* and the second sealing surface 109*b* are made to abut, is suppressed and the wear of the sealing surfaces can be reduced.

Figure 11:
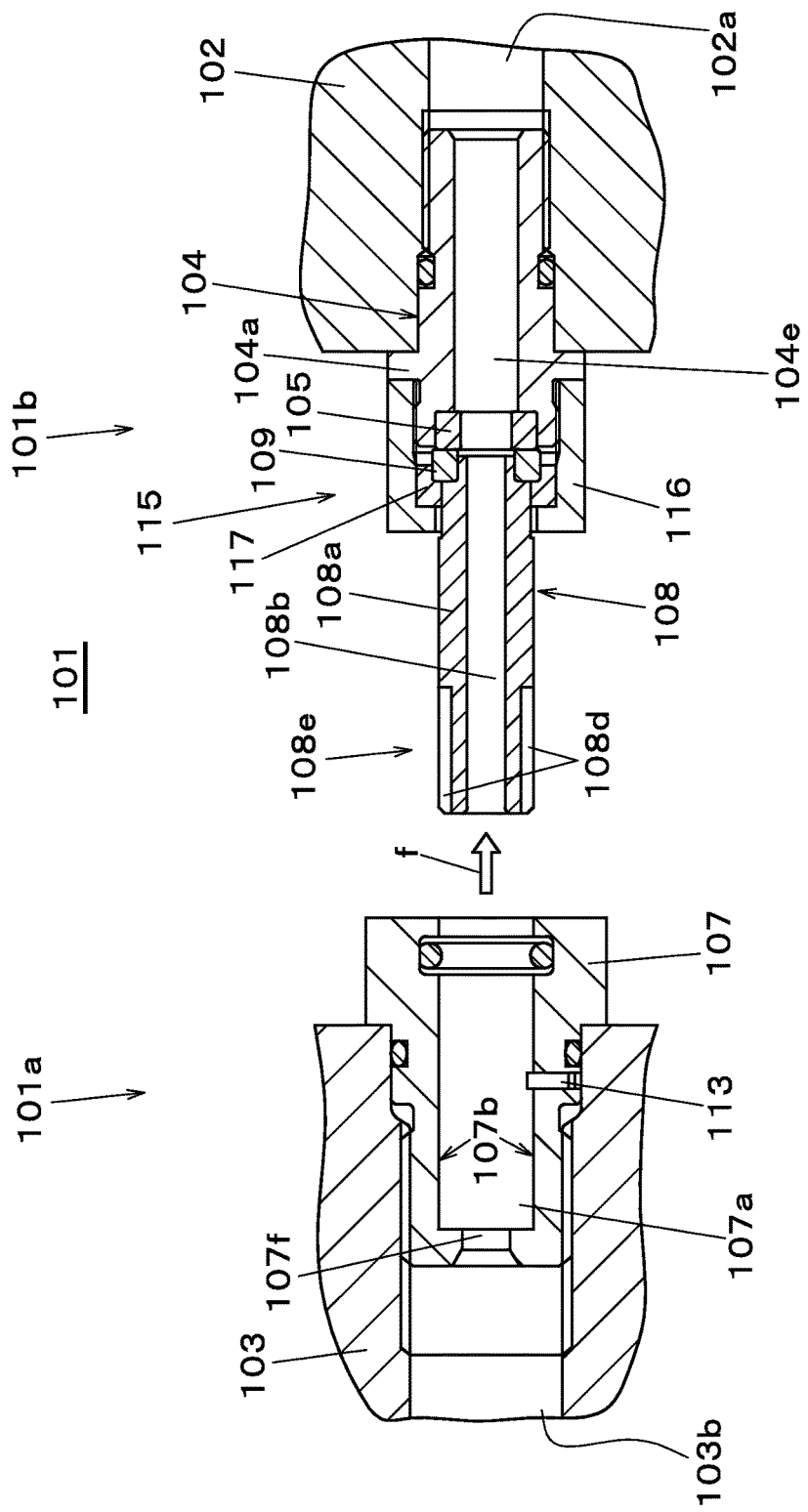
FIG. 11 is an explanatory view of the operation of a rotary joint in an embodiment 2 of the present invention.

FIG. 11 shows the procedure in the rotary joint 101 shown in the present embodiment when attaching the rotating part 101*a* to the stationary part 101*b* to assemble the rotary joint 101. In the present embodiment 2, the assembly is performed in the state with the floating seat 108 held by the engagement part 115 at the stationary part 101*b* side. In this case, when inserting (arrow mark "f") the shaft end part 108*e* of the shaft part 108*a* into the fitting hole 107*a* to fit them together, the rotational positions of the guide grooves 108*d* formed at the shaft part 108*a* and the guide pin 113 provided at the inner circumferential surface 107*b* of the fitting hole 107*a* about the axis have to match. At the time of assembly in the art not having an engagement part 115, since the floating seat 108 was provided alone, a worker could freely adjust the rotational position of the shaft part 108*a* about the axis while fitting it into the fitting hole 107*a*. Therefore, in assembly in the art, it was easy to match the positions of a guide groove 108*d* and the guide pin 113 in the rotational direction about the axis.

However, as shown in the present embodiment 2, the rotating part 101*a* is assembled with in the state where the shaft part 108*a* is held by the engagement part 115 in advance at the stationary part 101*b* side. With this configuration, a worker would have an extremely difficult time adjusting the rotational position of the shaft part 108*a* about the axis. For this reason, in the present embodiment 2, the rotation stopping mechanism M shown in FIG. 8 and FIG. 9 is configured as follows to improve the work efficiency when attaching the rotating part 101*a* to the stationary part 101*b* to assemble the rotary joint 101.

Figure 12A:
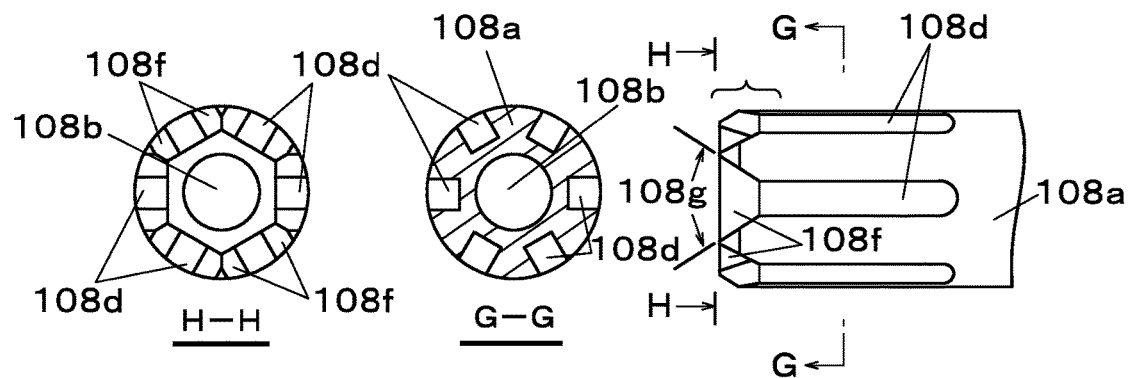
FIG. 12a is a front view, side view seen from the H-H direction, and cross-sectional view along the G-G line of a shaft side engagement part of a rotation stopping mechanism M assembled in a rotary joint in an embodiment 2 of the present invention.

FIG. 12*a* shows the detailed shape of the shaft end part 108*e* of the shaft part 108*a*. At the outer circumferential surface of the shaft end part 108*e*, a plurality of (here, six equally arranged) guide grooves 108*d* (groove parts) are formed in the axial direction as shaft side engagement parts provided at the shaft part 108*a* (see cross-section along the G-G line). The shaft end sides of the respective guide grooves 108*d* connect with bottom flaring shaped guides 108*f*. The inside surfaces of the guide grooves 108*d* connect with the guide surfaces 108*g* which open flaring outward.

Figure 12B:
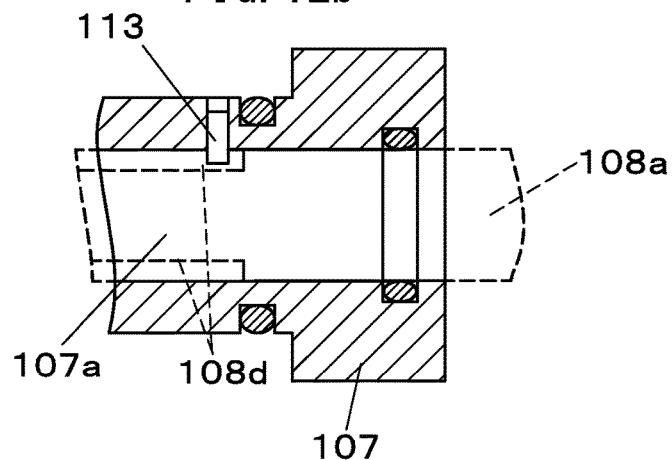
FIG. 12b is an explanatory view of a hole side engagement part of a rotation stopping mechanism M assembled in a rotary joint in an embodiment 2 of the present invention.

As shown in FIG. 12*b*, the inner circumferential surface of the rotor 107 is provided with a hole side engagement part comprised of the guide pin 113 sticking out from it. In the state where the shaft part 108*a* is fit in the fitting hole 107*a* of the rotor 107, one of the plurality of guide grooves 108*d* formed at the shaft end part 108*e* engages with the guide pin 113. Due to this, relative rotation of the shaft part 108*a* is restricted. That is, the guide pin 113 is provided at the inner circumferential surface of the fitting hole 107*a*. By engaging with shaft side engagement part comprised of any of the plurality of guide grooves 108*d*, this forms a rotation stopping use projecting part restricting the relative rotation of the shaft part 108*a*. In this case, the example is shown of using a rotation stopping projecting part comprised of the guide pin 113, but a key shaped member or other member of a shape other than a pin may be used so long as a configuration engaging with a guide groove 108*d* to restrict rotation of the shaft part 108*a*.

Figure 12C:
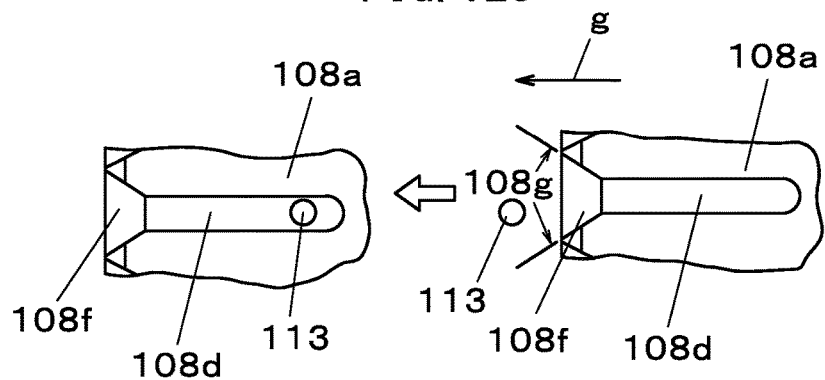
FIG. 12c is an explanatory view of a rotation stopping mechanism M assembled in a rotary joint in an embodiment 2 of the present invention.

FIG. 12*c* shows the guide action of a guide part 108*f* and guide surfaces 108*g* in the case of fitting into the fitting hole 107*a* the shaft part 108*a* at any relative rotation position with respect to the guide pin 113 in the fitting hole 107*a*. That is, in the operation of making the shaft part 108*a* move in the direction of the arrow mark "g" to engage with the fitting hole 107*a*, the position of the guide pin 113 in the rotational direction about the axis will not necessarily always match one of the guide grooves 108*d*. Usually, the guide pin 113 and the guide grooves 108*d* will be off in position.

Even in such a case, in the operation of fitting the shaft, a guide surface 108*g* of the guide part 108*f* abuts against the guide pin 113. Due to this, a force in the rotational direction acts on the shaft part 108*a* so that the corresponding guide groove 108*d* of the guide part 108*f* matches with the position of the guide pin 113. In the state where the shaft part 108*a* finishes being fit in, the guide pin 113 engages with one guide groove 108*d*, whereby relative rotation of the shaft part 108*a* with respect to the fitting hole 107*a*, is restricted.

That is, a guide part 108*f* at which the guide surfaces 108*g* are provided, functions as an engagement guide part which guides and engages a hole side engagement part, i.e., the guide pin 113 to and with a shaft side engagement part, i.e., a guide groove 108*d* in the operation of fitting the shaft part 108*a* in the fitting hole 107*a*. In the example shown in FIGS. 12*a* to 12*c*, an engagement guide part is provided at the shaft end part 108*e* of the shaft part 108*a* for each of the plurality of guide grooves 108*d* (groove parts). The engagement guide part is comprised of guide surfaces 108*g* guiding a rotation stopping projecting part comprised of the guide pin 113 to the guide groove 108*d*.

As the configuration of the rotation stopping mechanism M, various types of variations are possible aside from the configuration shown in FIGS. 12*a* to 12*c*, if the configuration has a shaft side engagement part provided at the shaft part 108*a*, a hole side engagement part provided at the fitting hole 107*a* and engaging with the shaft side engagement part to thereby restrict relative rotation, and an engagement guide part guiding and engaging the shaft side engagement part to and with the hole side engagement part in the operation of fitting the shaft. Below, these variations, that is, the rotation stopping mechanism MA and rotation stopping mechanism MB, will be explained. The rotation stopping mechanism MA and the rotation stopping mechanism MB are configured basically the same as the rotation stopping mechanism MA and rotation stopping mechanism MB explained in the embodiment 1.

Figure 13A:
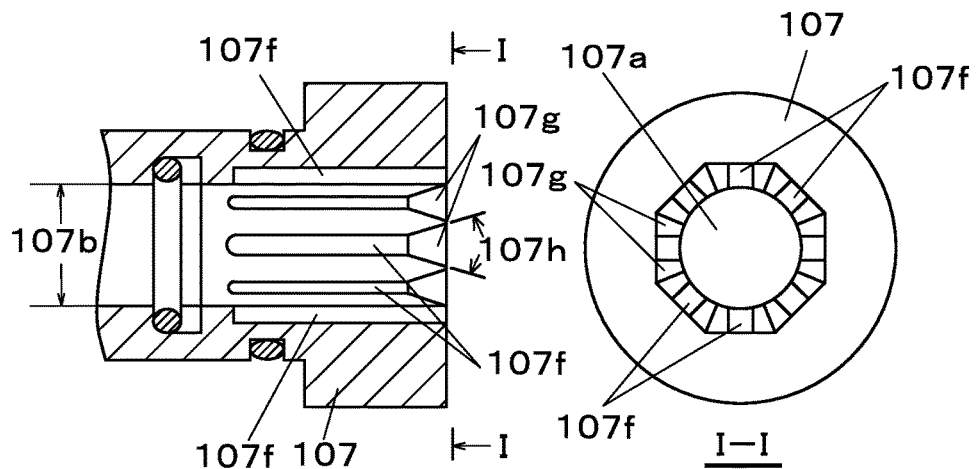
FIG. 13a is a cross-sectional view and a side view seen from the I-I direction of a hole side engagement part of a rotation stopping mechanism MA assembled in a rotary joint in an embodiment 2 of the present invention.

First, the rotation stopping mechanism MA will be explained with reference to FIGS. 13a to 13c. FIG. 13a shows the details of the inner circumferential surface 107b in the fitting hole 107a of the rotor 107. At the inner circumferential surface 107b of the fitting hole 107a, a plurality of (here, six equally arranged) guide grooves 107f (groove parts) are formed in the axial direction as hole side engagement parts provided at the fitting hole 107a (see side view of arrow mark I-I). The open end sides of these guide grooves 107f form bottom flaring shape guide parts 107g. The inside surfaces of the guide grooves 107f are connected with guide surfaces 107h which open flaring outward.

Figure 13B:
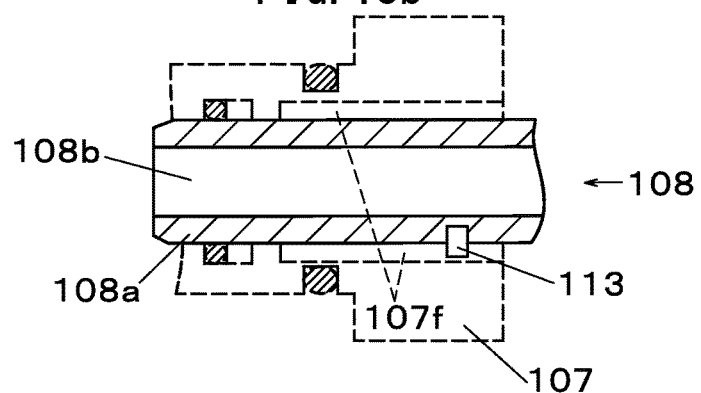
FIG. 13b is an explanatory view of a shaft side engagement part of a rotation stopping mechanism MA assembled in a rotary joint in an embodiment 2 of the present invention.

As shown in FIG. 13b, at the outer circumferential surface of the shaft part 108a, a shaft side engagement part comprised of the guide pin 113 is provided sticking out from it. In the state where the shaft part 108a fits in the fitting hole 107a of the rotor 107, one of the plurality of guide grooves 107f formed at the inner circumferential surface 107b engages with the guide pin 113 whereby relative rotation of the shaft part 108a is restricted. That is, the guide pin 113 is provided at the outer circumferential surface of the shaft part 108a and engages with a hole side engagement part comprised of any one of the plurality of guide grooves 107f. Due to this, the guide pin 113 forms a rotation stopping projecting part restricting relative rotation of the shaft part 108a. In the above case, the example is shown of using a rotation stopping use projecting part comprised of a guide pin 113, but the rotation stopping projecting part may use a member other than a pin such as a key shaped member so long as configured engaging with a guide groove 107f to restrict rotation of the shaft part 108a.

Figure 13C:
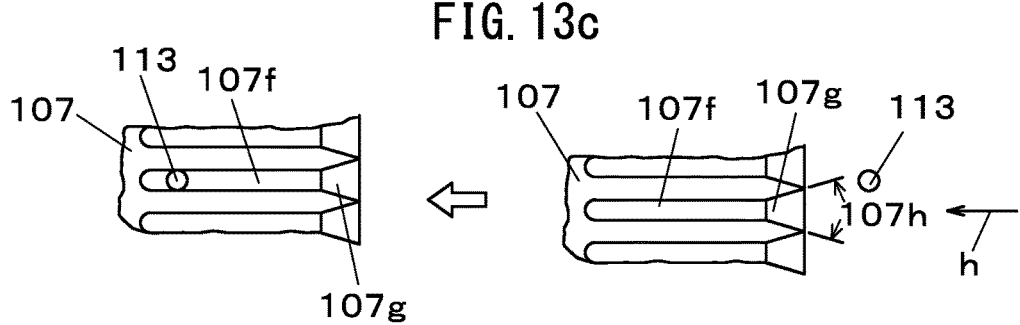
FIG. 13c is an explanatory view of a rotation stopping mechanism MA assembled in a rotary joint in an embodiment 2 of the present invention.

FIG. 13c shows the guide action of a guide part 107g and guide surfaces 107h in the case of fitting into the fitting hole 107a the shaft part 108a at any relative rotation position with respect to the guide pin 113 at the shaft part 108a. That is, in the operation of making the guide pin 113 move together with the shaft part 108a in the direction of the arrow mark "h" to engage with the fitting hole 107a, the position of the guide pin 113 in the rotational direction about the axis will not necessarily always match one of the guide grooves 107f. Usually, the guide pin 113 and the guide grooves 107f will be off in position.

In such a case as well, in the operation of fitting the shaft, a guide surface 107h of the guide part 107g abuts against the guide pin 113. Due to this, a force in the rotational direction acts on the shaft part 108a so that the corresponding guide groove 107f of the guide part 107g matches with the position of the guide pin 113. Due to this, in the state where the shaft part 108a finishes being fit in, the guide pin 113 engages with one guide groove 107f whereby relative rotation of the shaft part 108a with respect to the fitting hole 107a is restricted.

That is, the guide part 107g at which the guide surfaces 107h are provided, functions as an engagement guide part which guides and engages a shaft side engagement part, i.e., the guide pin 113 to and with a hole side engagement part, i.e., a guide groove 107f in the operation of fitting the shaft part 108a in the fitting hole 107a. In the example shown in FIGS. 13a to 13c, an engagement guide part is provided at the open end part of the fitting hole 107a for each of the plurality of guide grooves 107f (groove parts). The engagement guide part is comprised of guide surfaces guiding the rotation stopping projecting part comprised of the guide pin 113 to the guide groove 107f.

Figure 14A:
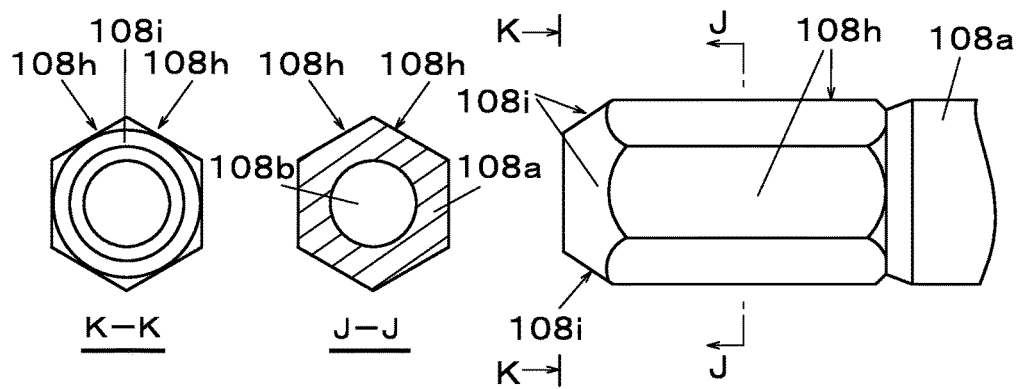
FIG. 14a is a front view, a side view seen from the K-K direction, and a cross-sectional view along the J-J line of a shaft side engagement part of a rotation stopping mechanism MB assembled in a rotary joint in an embodiment 2 of the present invention.

Next, the rotation stopping mechanism MB will be explained with reference to FIGS. 14a to 14c. As shown in FIG. 14a, the shaft end part of the shaft part 108a is worked to a polygonal cross-section (here, a hexagonal cross-section). At the outer circumferential surface, a plurality of (six) shaft side engagement parts comprised of flat parts 108h (see cross-sectional view along the J-H line) are formed in the axial direction. The shaft end sides of the flat parts 8h connect with a constricted bottom tapering shape guide surface 108i in a tapered manner or gently curved manner.

Figure 14B:
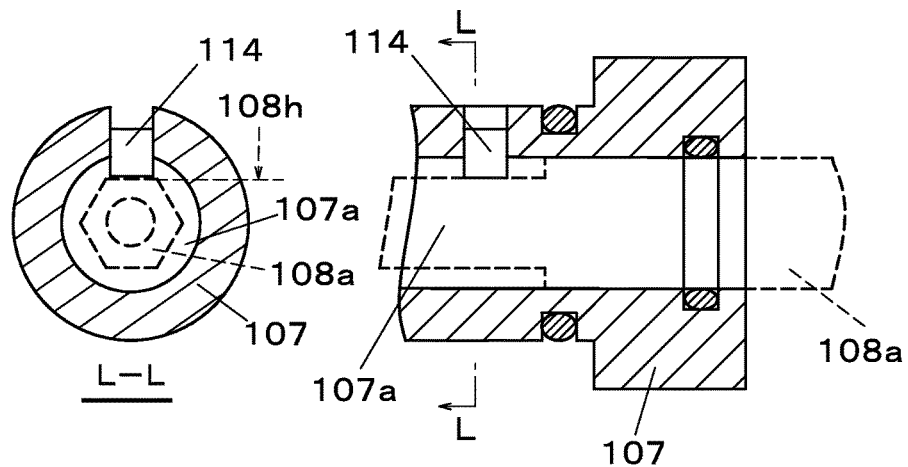
FIG. 14b is an explanatory view of a hole side engagement part of a rotation stopping mechanism MB assembled in a rotary joint in an embodiment 2 of the present invention.

As shown in FIG. 14b, the inner circumferential surface of the fitting hole 107a of the rotor 107 is provided with a hole side engagement part comprised of the abutting member 114. In the state where the shaft part 108a is fit in the fitting hole 107a, the abutting member 114 sticking out from the inner circumferential surface of the fitting hole 107a abuts against and engage with one of the plurality of flat parts 108h. Due to this, relative rotation of the shaft part 108a with respect to the fitting hole 107a is restricted. That is, the abutting member 114 is provided at the inner circumferential surface of the fitting hole 107a and abuts against and engages with a shaft side engagement part comprised of one of the plurality of flat parts 108h. Due to this, relative rotation of the shaft part 108a is restricted.

Figure 14C:
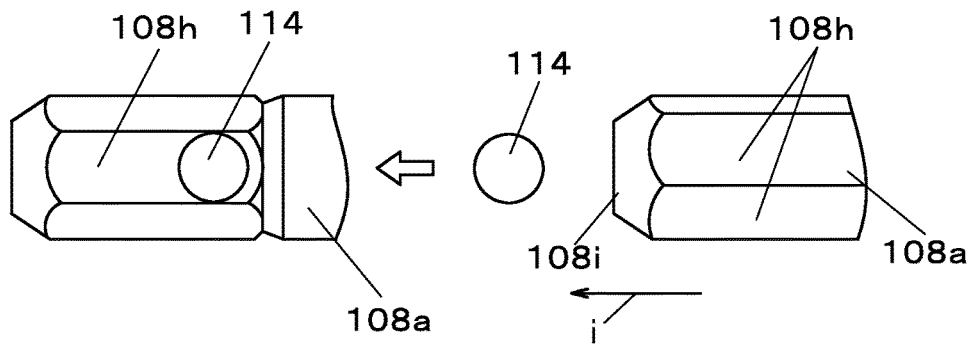
FIG. 14c is an explanatory view of a rotation stopping mechanism MB assembled in a rotary joint in an embodiment 2 of the present invention.

FIG. 14c shows the guide action of the guide surface 108i in the case where the shaft part 108 at any rotational position relating to the abutting member 114 in the fitting hole 107a, is fit into the fitting hole 107a. That is, in the operation of making the shaft part 108a move in the arrow mark "i" direction to fit it into the fitting hole 107a, the position of the abutting member 114 in the rotational direction about the axis will not necessarily always match one of the flat parts 108h. Usually, the abutting member 114 and the flat parts 108h will be off in position.

Even in such a case, in the shaft fitting operation, the bottom tapering shape guide surface 108i will abut against the abutting member 114 whereby the shaft part 108a will be acted on by a force in the rotational direction so that the nearest flat part 108h matches the position of the abutting member 114. Due to this, in the state where the shaft part 108a has finished being fit, the abutting member 114 will abut against and engage with one flat part 108h and relative rotation of the shaft part 108a with respect to the fitting hole 107a will be restricted.

That is, a guide surface 108i provided in a bottom tapering shape, functions as an engagement guide part which guides and engages a hole side engagement part, i.e., the abutting member 114 to a shaft side engagement part, i.e., a flat part 108h in the operation of fitting the shaft part 108a in the fitting hole 107a. In the example shown in FIGS. 14a to 14c, the engagement guide part is comprised of the guide surface 108i which is provided at the shaft end part 108e of the shaft part 108a and guides the abutting member 114 to a flat part 108h in the operation of fitting the shaft.

In the above embodiments 1 and 2, the examples are shown where the connecting members 16, 116 forming the engagement parts 15, 115 have cylindrical shaped covered parts 16a, 116a covering the face seals, which are formed by the rotating seal parts and the stationary seal parts, from the outer circumferential direction, but the present invention is not limited to this. The engagement part of the present invention may be of any structure so long as a structure able to allow relative rotation of the rotating seal part and the stationary seal part while restricting the separation of the rotating seal part and stationary seal part.

As explained above, the rotary joint shown in each of the embodiments 1 and 2 is a rotary joint comprised of a rotating part provided with a rotating channel in the axial direction, attached to a shaft, and advancing and retracting in the axial direction and, arranged coaxially, a stationary part provided with a stationary channel in the axial direction, which rotary joint is provided with an engagement part which allows relative rotation of a rotating seal part provided at the rotating part and a stationary seal part provided at the stationary part while stopping movement in the axial direction and which holds a state in which the two sealing surfaces of the rotating seal part and stationary seal part are made to abut facing each other and with a rotation stopping mechanism restricting relative rotation of the shaft part with respect to the fitting hole about the axis. Due to this, it is possible to stabilize relative movement of the stationary part and the rotating part to effectively prevent poor operation or impact on the seal members and to suppress leakage of fluid to the outside.

Furthermore, as the rotation stopping mechanism of the stationary shaft part 8a or the shaft part 108a, a configuration is adopted having a shaft side engagement part provided at the stationary shaft part 8a or the shaft part 108a, a hole side engagement part engaging with such a shaft side engagement part to restrict relative rotation of the stationary shaft part 8a or shaft part 108a, and an engagement guide part guiding and engaging the shaft side engagement part to and with the hole side engagement part in the operation of fitting the stationary shaft part 8a or shaft part 108a. Due to this, there is provided a rotary joint holding a state where the two sealing surfaces of the rotating seal part and the stationary seal part are made to abut facing each other wherein the work efficiency of the work of assembling the rotating part and the stationary part can be improved.

INDUSTRIAL APPLICABILITY

The rotary joint of the present invention can stabilize the relative movement of the stationary part and the rotating part to effectively prevent operational defects and impact on the seal members and suppress leakage of fluid to the outside. Further, it has the characteristic of being excellent in work efficiency in assembly work and is useful for applications supplying fluid coolant, air, or other fluid to the spindle of a machine tool or other rotating parts.

REFERENCE SIGNS LIST 1, 101. rotary joint
1a, 101a. rotating part
1b, 101b. stationary part
2, 103. spindle shaft
3, 102. casing
4, 107. rotor
4e, 108b. rotating channel
5, 105. first seal ring
5b, 105b. first sealing surface
7. housing member
8, 108. floating seat
8a, 104a. stationary shaft part
8b, 104e. stationary channel
8d, 108d. guide groove
9, 109. second seal ring
9b, 109b. second sealing surface
13, 113. guide pin
14, 114. abutting member
15, 115. engagement part
16, 116. connecting member
17, 117. bearing member
104. holding member
108a. shaft part

The invention claimed is:

1. A rotary joint comprising
a rotating part provided with a rotating channel in an axial direction, attached to a shaft, and advancing and retracting in said axial direction,
a stationary part provided with a stationary channel in said axial direction and arranged coaxially with the rotating part,
wherein fluid supplied from a fluid supply source is supplied to the rotating channel of said rotating part rotating about an axis thereof through said stationary channel,
a rotating seal part provided at said rotating part, and having a first sealing surface having a rotating channel opening at a side end face of said rotating part,
a stationary seal part
having a stationary shaft part fit in a fitting hole, which is formed in said axial direction and provided at said stationary part in a state where movement in said axial direction is allowed, and
having a second sealing surface having a stationary channel opening at a side end face of one side of said stationary shaft part,
a rotation stopping mechanism restricting relative rotation of said stationary shaft part with respect to said fitting hole about the axis, and
an engagement part allowing relative rotation of said rotating seal part and stationary seal part while stopping movement in said axial direction to hold a state where said first sealing surface and second sealing surface abut facing each other,
wherein said rotation stopping mechanism comprises
a shaft side engagement part provided at said stationary shaft part,
a hole side engagement part provided at said fitting hole and engaging with said shaft side engagement part to restrict said relative rotation, and
an engagement guide part guiding said shaft side engagement part by flaring or tapering guide surfaces to said hole side engagement part to make them engage in an operation for fitting said stationary shaft part into said fitting hole,
said engagement part makes said first sealing surface and second sealing surface abut whereby a face seal is formed, and
said rotating part is made to advance and retract in the state where said face seal is formed, whereby said stationary shaft part advances and retracts in the axial direction together with said rotating part.

2. The rotary joint according to claim 1, wherein said engagement part comprises:
a connecting member fixed to said rotating seal part,
a rotating side abutting part provided extending from said connecting member to said stationary seal part side and abutting against said stationary seal part to restrict separation of the first sealing surface and the second sealing surface, and
a bearing member provided at this rotating side abutting part so as to abut against said stationary seal part and allowing relative rotation of said rotating seal part and said stationary seal part.

3. The rotary joint according to claim 1, wherein said shaft side engagement part is a plurality of groove parts formed in the axial direction at an outer circumferential surface of the shaft end side of said stationary shaft part,
    said hole side engagement part is a rotation stopping projecting part provided at an inner circumferential surface of said fitting hole and engaging with any of said groove parts to restrict said relative rotation, and
    said engagement guide part having the flaring or tapering guide surfaces is provided at the shaft end part of said stationary shaft part for each of said plurality of groove parts and guiding said rotation stopping projecting part to said stationary shaft part in an operation for fitting said stationary shaft part into said fitting hole.

4. The rotary joint according to claim 1, wherein said hole side engagement part is a plurality of groove parts formed in the axial direction at an inner circumferential surface of said fitting hole,
    said shaft side engagement part is a rotation stopping projecting part provided at an outer circumferential surface of said stationary shaft part and engaging with any of said groove parts to restrict said relative rotation, and
    said engagement guide part having the flaring or tapering guide surfaces is provided at the hole end part of said fitting hole for each of said plurality of groove parts and guiding said rotation stopping projecting part to said stationary shaft part in an operation for fitting said stationary shaft part into said fitting hole.

5. The rotary joint according to claim 1, wherein said shaft side engagement part is a plurality of flat parts formed in the axial direction at the outer circumferential surface by working a shaft end side of said stationary shaft part to a polygonal cross-section,
    said hole side engagement part is an abutting member provided at an inner circumferential surface of said fitting hole and engaging with any of said flat parts to restrict said relative rotation, and
    said engagement guide part having the flaring or tapering guide surfaces is provided at a shaft end part of said stationary shaft part and guiding said abutting member to said flat part in an operation for fitting said stationary shaft part into said fitting hole.

6. A rotary joint comprising
    a rotating part provided with a rotating channel in an axial direction, attached to a shaft, and advancing and retracting in said axial direction,
    a stationary part provided with a stationary channel in said axial direction and arranged coaxially with the rotating part,
    wherein fluid supplied from a fluid supply source is supplied to the rotating channel of said rotating part rotating about an axis thereof through said stationary channel,
    a stationary seal part provided at said stationary part, and having a first sealing surface having a stationary channel opening at a side end face of said stationary part,
    a rotating seal part
        having a shaft part fit in a fitting hole, which is formed in said axial direction and provided at said rotating part in a state where movement in said axial direction is allowed, and
        having a second sealing surface having a rotating channel opening at a side end face of one side of said shaft part,
    a rotation stopping mechanism restricting relative rotation of said shaft part with respect to said fitting hole about the axis, and
    an engagement part allowing relative rotation of said stationary seal part and rotating seal part while stopping movement in said axial direction to hold a state where said first sealing surface and second sealing surface abut facing each other,
    wherein said rotation stopping mechanism comprises
        a shaft side engagement part provided at said shaft part,
        a hole side engagement part provided at said fitting hole and engaging with said shaft side engagement part to thereby restrict said relative rotation, and
        an engagement guide part guiding said shaft side engagement part by flaring or tapering guide surfaces to said hole side engagement part to make them engage in an operation for fitting said shaft part into said fitting hole,
    said engagement part makes said first sealing surface and second sealing surface abut whereby a face seal is formed, and
    said rotating part is made to advance and retract in the state where said face seal is formed whereby said rotating part advances and retracts in the axial direction with respect to said rotating part locked with said stationary seal part.

7. The rotary joint according to claim 6, wherein said engagement part comprises
    a connecting member fixed to said stationary seal part,
    a stationary side abutting part provided extending from said connecting member to said rotating seal part side and abutting against said rotating seal part to restrict separation of the first sealing surface and the second sealing surface, and
    a bearing member provided at this stationary side abutting part so as to abut against said rotating seal part and allowing relative rotation of said rotating seal part and said stationary seal part.

8. The rotary joint according to claim 6, wherein said shaft side engagement part is a plurality of groove parts formed in the axial direction at an outer circumferential surface of the shaft end side of said shaft part,
    said hole side engagement part is a rotation stopping projecting part provided at an inner circumferential surface of said fitting hole and engaging with any of said groove parts to restrict said relative rotation, and
    said engagement guide part having the flaring or tapering guide surfaces is provided at the shaft end part of said shaft part for each of said plurality of groove parts and guiding said rotation stopping projecting part to said shaft part in an operation for fitting said stationary shaft part into said fitting hole.

9. The rotary joint according to claim 6, wherein said hole side engagement part is a plurality of groove parts formed in the axial direction at the inner circumferential surface of said fitting hole,
    said shaft side engagement part is a rotation stopping projecting part provided at an outer circumferential surface of said shaft part and engaging with any of said groove parts to restrict said relative rotation, and
    said engagement guide part having the flaring or tapering guide surfaces is provided at an open end part of said fitting hole for each of said plurality of groove parts and guiding said rotation stopping projecting part to said shaft part in an operation for fitting said stationary shaft part into said fitting hole.

10. The rotary joint according to claim 6, wherein said shaft side engagement part is a plurality of flat parts formed in the axial direction at the outer circumferential surface by working a shaft end side of said shaft part to a polygonal cross-section, said hole side engagement part is an abutting member provided at an inner circumferential surface of said fitting hole and engaging with any of said flat parts to restrict said relative rotation, and said engagement guide part having the flaring or tapering guide surfaces is provided at a shaft end part of said shaft part and guiding said abutting member to said flat part in an operation for fitting said stationary shaft part into said fitting hole.

\* \* \* \* \*